US011377357B2

(12) United States Patent
Newman et al.

(10) Patent No.: US 11,377,357 B2
(45) Date of Patent: Jul. 5, 2022

(54) METHODS OF PRODUCING DIAMOND PARTICLES AND APPARATUS THEREFOR

(71) Applicant: UNIT CELL DIAMOND LLC

(72) Inventors: Arnold L. Newman, Bethesda, MD (US); Daniel Hodes, Owings Mills, MD (US)

(73) Assignee: Unit Cell Diamond, Bethesda, MD (US)

(*) Notice: Subject to any disclaimer, the term of this patent is extended or adjusted under 35 U.S.C. 154(b) by 500 days.

(21) Appl. No.: 16/300,156

(22) PCT Filed: May 10, 2017

(86) PCT No.: PCT/US2017/000032
§ 371 (c)(1),
(2) Date: Nov. 9, 2018

(87) PCT Pub. No.: WO2017/196410
PCT Pub. Date: Nov. 16, 2017

(65) Prior Publication Data
US 2019/0263665 A1    Aug. 29, 2019

Related U.S. Application Data

(60) Provisional application No. 62/334,797, filed on May 11, 2016.

(51) Int. Cl.
*C01B 32/26* (2017.01)
*B01J 19/08* (2006.01)
(Continued)

(52) U.S. Cl.
CPC ............. *C01B 32/26* (2017.08); *B01J 19/088* (2013.01); *B01J 19/121* (2013.01); *B01J 19/126* (2013.01);
(Continued)

(58) Field of Classification Search
CPC ....... C01B 32/26; C01B 32/184; C01B 32/28; B82Y 40/00; C01P 2004/32;
(Continued)

(56) References Cited

U.S. PATENT DOCUMENTS 4,873,115 A * 10/1989 Matsumura ........... C23C 16/272
427/577
5,265,913 A    11/1993 Sommer
(Continued)

OTHER PUBLICATIONS

Solvents. Kirk-Othmer Encyclopedia of Chemical Technology. Copyright 2017 John Wiley & Sons, Inc. DOI: 10.1002/0471238961. 1915122219211212.a01.pub3 (Year: 2017).*
(Continued)

*Primary Examiner* — Xiuyu Tai
(74) *Attorney, Agent, or Firm* — William Beaumont; Juneau & Mitchell

(57) ABSTRACT

A solid state combinatorial synthesis of particulate diamond ranging in size from the macroscopic down to the nanoscale, which entails: a) forming a solution having a source of reactant atoms, a tetrahedranoidal compound reactant, and a solvent vehicle; b) forming liquid droplets of the solution; c) evaporating the solvent vehicle from the liquid droplets of the solution to form particles containing a homogenous solid mixture of the reactants; and d) exposing the particles of the homogeneous solid mixture to a high energy discharge thereby forming diamond particles.

19 Claims, 7 Drawing Sheets

(51) Int. Cl.
*B01J 19/12* (2006.01)
*B82Y 40/00* (2011.01)

(52) U.S. Cl.
CPC .............. *B01J 2219/0805* (2013.01); *B01J 2219/0879* (2013.01); *B01J 2219/12* (2013.01); *B01J 2219/1206* (2013.01); *B82Y 40/00* (2013.01); *C01P 2004/32* (2013.01)

(58) Field of Classification Search
CPC ............ B01J 2219/1206; B01J 2219/12; B01J 2219/0879; B01J 2219/0805; B01J 19/088; B01J 19/121; B01J 19/126; B01J 19/129; B01J 2219/123; B01J 2219/0877; C23C 16/52; C23C 16/4412; C23C 16/0272; C23C 14/54; C23C 16/04; C23C 16/27; C23C 16/458; C23C 16/452; C23C 16/274
USPC ..................................................... 204/157.47
See application file for complete search history.

(56) References Cited

U.S. PATENT DOCUMENTS

| | | | |
|---|---|---|---|
| 5,474,808 A | 12/1995 | Aslam | |
| 5,871,805 A | 2/1999 | Lemelson | |
| 6,592,839 B2 | 7/2003 | Gruen et al. | |
| 7,160,489 B2 | 1/2007 | Didenko et al. | |
| 2004/0206941 A1* | 10/2004 | Gurin ............... | B82Y 30/00 252/500 |
| 2010/0261058 A1* | 10/2010 | Lopatin ............ | H01M 4/133 429/212 |
| 2014/0286851 A1* | 9/2014 | Hodes .............. | B01J 19/126 204/157.43 |
| 2015/0259790 A1 | 9/2015 | Newman | |

OTHER PUBLICATIONS

Wang et al., "Thermochemistry of Benzvalene, Dihydrobenzvalene and Cubane: A High-Level Computational Study", J. Phys. Chem. B 1997, 101, 3400-3403; abstract.

* cited by examiner $X = -CH=CH-, CO, C_2H_4, \text{ or } -N=N-$ $X = -CH=CH-, CO, C_2H_4, \text{ or } -N=N-$

METHODS OF PRODUCING DIAMOND PARTICLES AND APPARATUS THEREFOR

FIELD OF THE INVENTION

The present invention relates to methods and apparatus for performing the combinatorial synthesis of the diamond unit cell and forming particulate masses therefrom.

More specifically, the present invention relates to methods and apparatus for controllably producing at least one particle of diamond using the combinatorial synthesis of the diamond unit cell and controllably forming a particulate mass therefrom wherein the particulate mass can range from macroscopic to nanoscale sizes.

BACKGROUND OF THE INVENTION

Particulate diamond is becoming a commercially and industrially useful material with a growing number of applications. For example, particulate diamond has the potential to become an important structural component of composites. Further, particulate diamond is also useful as an abrasive or grinding grit and different size particles can be chosen to fabricate abrasives that range from coarse to extremely fine, polishing grade material. By sintering, particulate diamond can be made into a large variety of configurations with varying microstructures for mechanical applications such as machine tools, saws, earth boring drill bits (e.g., compacts, inserts), etc. Diamond particles with nanometer dimensions (i.e., "nanodiamond") are promising as engine oil additives, as vehicles of systemic and transdermal drug delivery, and in electronics, where they may find application as sensor components, photonic optoelectronic devices for optical computing and as important components of quantum mechanical computing systems.

Diamond particles are commonly produced for most industrial applications by crushing larger, typically industrial-grade diamonds (e.g., bort). These can be sorted according to size. The smallest diamond particles, nanodiamonds, are produced primarily through explosive detonation. For example, when a mixture of trinitrotoluene (TNT) and hexogene (RDX) is detonated in an oxygen deficient, closed chamber, diamond particles of about 5 nanometers in size are formed. Other means of producing nanodiamond include ultrasonication of graphite in an organic liquid, irradiation of graphite with high-energy laser pulses, and dissociation of ethanol vapor with a microplasma.

Yet, none of the conventional methods of producing diamond particles consistently, controllably, and economically yield a product that is effectively free of impurities. Diamond purity is important for many applications because impurities degrade the physical and chemical properties that make diamond so useful. For example, the beneficial heat conductivity of diamond is degraded by impurities that inhibit the mechanism by which diamond conducts heat (e.g., impurities can cause phonon scattering). As another example, impure diamond adheres to other materials less effectively than pure diamond. This problem can seriously increase the failure rate of bearings, drill bits, machine tools, and other mechanical applications. Clearly, it is uneconomical to crush gem-quality diamonds to produce more pure diamond particles. Synthetic processes for making a purer particulate diamond are also expensive. Thus, there is a strong, unmet need for producing particulate diamond that is pure, economical, and in sufficient quantity to meet the growing commercial and industrial demand for particulate diamond.

There are presently a variety of ways to produce particulate diamond. In U.S. Pat. No. 5,364,423, Bigelow et al. disclose a method for making diamond grit and abrasive media that involves crushing a synthetic diamond film produced by chemical vapor deposition. This approach is vulnerable to the typical limits of chemical vapor deposition processes for making diamond. For example, these processes are expensive and yield diamond films that are impure and slow to form. Saito et al., in U.S. Pat. No. 8,506,919, disclose a method for producing a fine powder of single crystalline diamond particles. Single crystalline diamond particles are crushed then chemically modified to produce a hydrophilic surface to facilitate the formation of an aqueous diamond slurry. Finally, the particles are subjected to a grading process to select a range of particle size. Bigelow et al. and Saito et al., rely on the mechanical crushing of diamond material to form diamond particles, and, moreover, use diamond as a starting material.

Man-made diamond particles of nanoscale dimensions (i.e., less than a micron) can be produced by detonation processes. For example, Dolmatov, in U.S. Pat. No. 7,867,467, discloses producing nanodiamond wherein a carbon-containing, oxygen-deficient explosive material and a reducing agent are detonated in a closed space. Chemical refinement of the product yields diamond nanoparticles containing up to 98% carbon but which also contain hydrogen, oxygen and nitrogen impurities. In U.S. Pat. No. 8,506,920, Swanson also teaches the explosive production of diamond but uses carbon dioxide as the oxidizing agent and a fuel such as powdered magnesium to produce diamond dust. In U.S. Pat. No. 8,728,429, Shenderova discloses the production of conductive nanodiamond with dynamic synthesis approaches that involve mixing an explosive material with a non-explosive, carbon-containing material and detonating the mixture under oxygen-limited conditions. Instead of using an explosion to produce nanodiamond, in U.S. 2014/0161710, Zousman discloses the controlled synthesis of nanodiamond by creating acoustic shock waves with a radiation beam in a transparent liquid containing a non-diamond carbon source.

Kumar et al., disclose in their Nature Communications article, the formation of nanodiamonds at near-ambient conditions via microplasma dissociation of ethanol vapor. This approach produces nanodiamond that must be selectively etched to remove non-diamond carbon.

Nanodiamond has also been produced by high energy impact methods that cause microscopic diamond particles to further reduce in size to nanoscale dimensions. For example, Curmi et al., in U.S. Pat. No. 8,932,553, disclose the production of cubic diamond nanocrystals by nitrogen jet milling micronization followed by nanomilling with a planetary tungsten carbide ball mill and then an acid treatment. In U.S. Pat. No. 9,099,375, Kub et al., disclose producing a nanodiamond-containing layer on a substrate wherein the nanodiamond particles are formed by colliding diamond particles with the substrate. An aerosol of submicron diamond particles is directed toward a substrate and, through collision with the substrate, a nanodiamond layer is thereby formed.

In U.S. Pat. No. 7,160,489, Didenko et al. disclose the controlled chemical aerosol flow synthesis of nanometer-sized particles. Their method uses ultrasonic spray pyrolysis wherein chemical reactions occur inside tiny liquid droplets that contain reactants and a surfactant. Notably, this is a liquid phase approach to synthesizing nanoparticles, that is, the reaction proceeds within each liquid droplet. Further-more, Didenko et al. stipulate the use of a high boiling point liquid so that the reaction is assured of occurring in the liquid phase.

In U.S. 2003/0206488, Huang et al. disclose a method for manufacturing semiconducting quantum particles. They mix first and second precursor compositions, one of which is a metallic element, to form a reacting fluid made up of nanometer-size compound semiconductor clusters as precipitates in a liquid medium. These are then atomized to break up the reacting fluid into fluid droplets of micron and nanometer sizes. Further processing is then performed to allow for cluster separation and/or passivation. The fluid droplets are then dried and the particles collected. Notably, the disclosed reaction occurs in the liquid state.

Haag, in WO 2015/176045, discloses the synthesis of nanoparticles and strained nanoparticles wherein a precursor solution, containing a volatile solvent and nanoparticle precursor, is aerosolized in the presence of a flowing carrier gas to yield a reactant stream. The reactant stream is heated above the boiling point of the volatile solvent to form a product stream of nanoparticles, which are then cooled and collected. However, Haag neither discloses nor suggests a synthesis of diamond, much less, a solid state combinatorial synthesis of diamond particles wherein the solid state reaction is initiated by a high energy discharge.

Thus, a need exists for a method of preparing particulate diamond of variable size without impurities in a controllable manner, and without using diamond as a starting material. A need further exists for a method of preparing particulate diamond of variable size without impurities that does not rely on mechanical grinding, explosive detonation or shockwaves.

SUMMARY OF THE INVENTION

Accordingly, it is an object of the present invention to provide a method for producing diamond particles using a combinatorial synthesis by forming particulate masses of diamond unit cells each of which contains a tetrahedral structure having four apical carbon atoms and one carbon atom in the center of the tetrahedral unit cell.

It is a further object of the present invention to produce, in a controllable way, diamond particles whose size is determined by producing a droplet with dimensions within a narrow range that contains a predetermined concentration of reactants.

It is yet a further object of the present invention to use the combinatorial method of diamond unit cell synthesis to provide a degree of control over the resulting diamond products so produced that has thus far been unobtainable by other methods.

It is a further object of the present invention to produce particles of homodiamond or heterodiamond.

It is yet another object of the present invention to produce macroscopic and microscopic diamond particles as well as nanodiamond particles.

It is, moreover, another object of the present invention to produce particulate diamond of variable sizes without using diamond seeds, mechanical grinding, explosive detonation or shockwaves.

It is yet a further object of the present invention to provide one or more reactors that are particularly designed to produce both homodiamond and heterodiamond by the combinatorial synthesis.

The above objects and others are accomplished by methods and apparatus for forming droplets of a reactant solution, evaporating the solvent from the reactant solution to form homogeneous solid reactant particles, and subjecting these particles to a high energy discharge to form diamond particles.

DETAILED DESCRIPTION OF THE PREFERRED EMBODIMENTS

Term Definitions

Diamond: for purposes described herein, "diamond" may refer to both homodiamond and heterodiamond, although each of the terms homodiamond and heterodiamond may also be used separately. Homodiamond as used herein means diamond containing only carbon lattice atoms, whereas heterodiamond means diamond containing one or more heteroatoms, such as N, in the diamond lattice.

Figure 1:
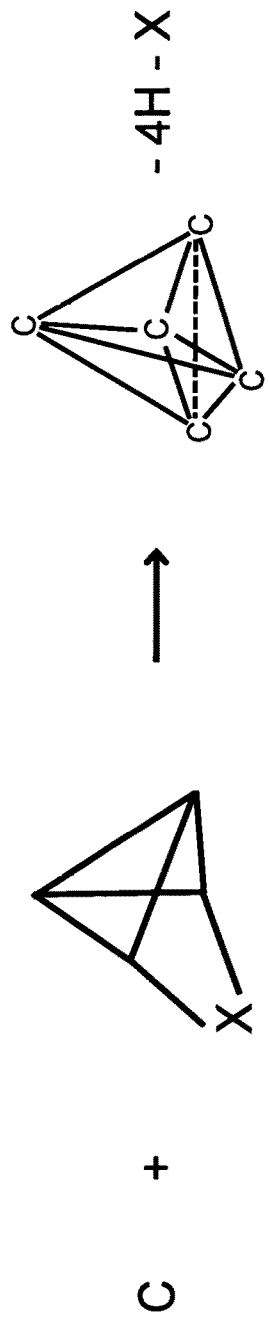
FIG. 1 illustrates a solid state reaction that produces homodiamond using any one of four tetrahedranoidal reactants.

Tetrahedranoidal compound: means any tetrahedranoidal compound having the ability to react with an active carbon atom to form the diamond unit cell of the present invention. Examples are benzvalene, dihydro-benzvalene, 3,4-diazabenzvalene and 2,3,4-methynylcyclobutanone ("tetrahedranone"). Of particular advantage are tetrahedranoidal compounds having leaving groups, such as —CH=CH— as in benzvalene, $C_2H_4$ as in dihydro-benzvalene, —CO— as in tetrahedranone and —N=N— as in 3,4-diazabenzvalene as shown in FIG. 1 for homodiamond preparation, and in FIG. 2 for heterodiamond preparation.

High energy discharge: means any high energy radiation produced by, for example, an electric arc, microwave generator, or laser, for example. Any of these devices may be used to produce a high energy discharge to drive the combinatorial synthesis of particulate homodiamond and/or heterodiamond. Generally, for a microwave generator, power in the range of from about 1 kW to 2 kW at a frequency of from about 11 to 13 GHz is used. More preferably, 0.9 to 1.2 kW at a frequency of about 12 GHz is used.

Reactant solvents: means any solvent that is used as vehicle for at least one reactant used in the combinatorial synthesis of particulate homodiamond and/or heterodiamond. It is important that any solvent used as a solvent vehicle be of high vapor pressure (under ambient conditions) to facilitate solvent evaporation from both reactants prior to application of the high energy discharge. As a non-limiting example, methylene chloride ($CH_2Cl_2$) may be used as a solvent vehicle for any of cubane, benzvalene, dihydro-benzvalene, tetrahedranone or 3,4-diazabenzvalene. Cubane may also be solubilized by short chain hydrocarbons (e.g., pentane, hexane, etc.). A co-solvent mixture may also be used. Further, solvents, such as dialkyl ethers, chloroform, methylene chloride or hydrocarbons may be used as a solvent vehicle for hydrazine. The same considerations apply when using anhydrous ammonia rather than hydrazine as a nitrogen source for preparing N-heterodiamond.

Nozzles: means any known type of nozzle that is used to generate small drops. For example, the ultrasonic atomizing nozzle of U.S. Pat. No. 7,712,680 B2 may be used as the nozzle of any apparatus disclosed in this specification. As another example, the multiple horn atomizer of U.S. Pat. No. 6,669,103 B2 may be used as the nozzle of any apparatus disclosed in this specification. Both U.S. Pat. Nos. 6,669,103 B2 and 7,712,680 B2 are incorporated herein in their entirety. Thus, any of these nozzles may be used, for example as nozzle component 8 in FIG. 3 of the present specification with each type of nozzle being in fluid connectivity as is shown nozzle component 8 in FIG. 3 of the present specification.

Reactant atoms: means the active atoms reacting with the tetrahedranoidal compound. For example, in producing particulate homodiamond, the reactant atoms are carbon atoms. In producing particulate nitrogen (N)— heterodiamond, the reactant atoms are nitrogen atoms.

Diamond unit cell: means the complex of the tetrahedranoidal compound and a single carbon atom inserted therein, which reacts with crystallographic propagation driven by internal energy to form homodiamond mass. Analogously, in the preparation of heterodiamond, the diamond unit cell means the complex of the tetrahedranoidal compound and a single heteroatom inserted therein, which reacts with crystallographic propagation driven by internal energy to form heterodiamond mass. The structure of the diamond unit cell is shown herein. The diamond unit cell constructed purely of five carbon atoms has four carbon atoms at an apical position and one carbon atom inserted therein as shown herein. This diamond unit cell may be thought of as carbon tetracarbide. The diamond unit cell used to form heterodiamond by crystallographic propagation driven by internal energy is constructed of four carbon atoms at an apical position and one heteroatom, such as nitrogen, silicon or phosphorus, for example, inserted therein as shown. This diamond unit cell may be thought of generically as heteroatom tetracarbide or, specifically, as nitrogen tetracarbide, silicon tetracarbide or phosphorus tetracarbide, depending, of course, on the heteroatom used in the combinatorial synthesis.

Carbon source: means a reactant that is a source of carbon atoms, such as cubane, for example.

Heteroatom: means any atom other than carbon, such as nitrogen, phosphorus, silicon or aluminum, for example.

Heteroatom source: means a reactant that is a source of heteroatoms. For example, hydrazine is a nitrogen source.

Inert gases: means helium, neon, argon, krypton and/or xenon. This term includes neither nitrogen nor carbon dioxide.

Crystallographic propagation: refers to the manner in which the diamond unit cell driven by internal energy proceeds to form either homodiamond mass or heterodiamond mass depending upon whether the reactive atom used is carbon or a heteroatom, respectively.

Sensor and Actuator bus and System Controller bus: refer to the communication system "wiring" pathways that transfer data and/or signals between components that comprise a computerized system for determining, monitoring and/or modifying a chemical or physical, process variable or variables. See, for example, US 2013/0031285 A1 and U.S. Pat. No. 5,469,150, which are both incorporated herein in the entirety. See also U.S. Pat. Nos. 4,886,590 and 6,590,131 B2, which both describe chemical process control systems. Both U.S. Pat. Nos. 4,886,590 and 6,590,131 B2 are also incorporated herein in their entirety. Further, control systems are known wherein various types of instrumentation, such as GC-MS, have been used to provide input data for modification of chemical processes. See, for example, U.S. Pat. No. 8,080,426 B1, which is incorporated herein in the entirety.

Reactor: means any of the apparatuses described hereinbelow. Generally, each reactor or apparatus contains: i) a reaction chamber; ii) means for providing a controllable flow of inert carrier gas within the reaction chamber; iii) at least one sensor and at least one actuator for regulating temperature and pressure within the reaction chamber; iv) a reservoir for containing a reactant solution, the reactant solution containing a source of reactant atoms, a tetrahedranoidal reactant, and a solvent; v) a controllable dispenser, operably connected to the reservoir, for dispensing at least one droplet of the reactant solution into the reaction chamber; vi) a controllable high energy discharge source located in the reaction chamber for effecting particulate diamond formation; vii) a particulate diamond collector; and viii) a system controller for controlling operation of, and conditions within, the reaction chamber, whereby the at least one sensor and at least one actuator suite communicates bidirectionally with the system controller through the at least one sensor and an actuator bus and system controller bus. Table 1 is a concordance table between recited claim function and exemplary structural elements.

| Functional Term | structural element |
| --- | --- |
| reaction chamber | reaction chamber 22 |
| means for providing a controllable flow of inert carrier gas within said reaction chamber | carrier gas source 42, carrier gas conduit 44, carrier gas source valve 92, effluent control valve line 98, carrier gas exit port flow sensor 63a, carrier gas input flow sensor 63b |
| at least one sensor for regulating temperature | temperature sensor 66a |
| at least one actuator for regulating temperature | temperature controller 86 |
| at least one sensor for regulating pressure | pressure sensor 66c |
| at least one actuator for regulating pressure | pressure is regulated by controlling flow via carrier gas source valve 92 and effluent control valve 96 |
| reservoir for containing a reactant solution | reactant source reservoir 80 contains reactant solution 6 |
| a controllable dispenser, operatively connected to said reservoir | spray nozzle 26, reactant source valve 90, and reactant source valve control line 76 |
| a controllable high energy discharge source | high energy discharge source 28 and discharge source control line 74 |
| means for collecting particulate diamond product | collector 140 |
| system controller | system controller 50 |
| sensor and an actuator suite | sensor and actuator suite 60 |

Combinatorial Synthesis of Diamond in the Solid State

The combinatorial synthesis of the diamond unit cell provides a method for quickly producing, at low temperature, pure diamond masses. This synthesis and apparati for implementing it are disclosed in U.S. Pat. Nos. 8,778,295 and 9,061,917, as well as in pending U.S. application Ser. No. 14/934,679, and in published U.S. applications 2015/0259213 and 2015/0259790, all of which U.S. patents, application and two published applications are incorporated herein in the entirety.

The diamond unit cell is a tetrahedral structure containing five carbon atoms with a carbon atom at each of the four apices and one in the center "cage" position. Each carbon atom is bonded to each other in the diamond unit cell. The bonds in the diamond unit cell are believed to be short, strong $sp^3$ bonds, which yield the three-dimensional solid structure of diamond. The structure of diamond is readily contrasted with graphite, another allotrope of carbon, which has $sp^2$ bonds and is planar.

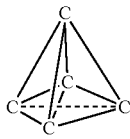

The diamond unit cell, a five carbon tetrahedral molecule

The combinatorial synthesis of the diamond unit cell disclosed in U.S. Pat. Nos. 8,778,295 and 9,061,917, proceeds by the reaction of an excited state carbon atom with a tetrahedranoidal molecule with concomitant rejection of leaving groups to form the diamond unit cell.

A tetrahedranoidal molecule is depicted generically by the following structure, which can serve as a selection guide.

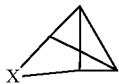

Note that the structure exhibits a tetrahedral geometry except that in the base, a leaving group, shown generically as X, is "inserted" in place of a C—C bond. It functions to stabilize the tetrahedranoidal structure of the molecule. X is preferably a volatile substance that can quickly leave the tetrahedranoidal molecule as it reacts with a carbon atom to form diamond. If a less volatile group is used to stabilize the tetrahedranoidal molecule, the purity of the diamond product formed by the reaction may be diminished. There may be times, however, when impure diamond is desired. Although other leaving groups can be used, for the purposes of the present invention, that is, for producing purer diamond, preferred leaving groups include: —CH=CH—, $C_2H_4$, CO, or —N=N—. Thus, in view of the above, one with ordinary skill in the art can select a variety of tetrahedranoidal compounds that can be used as reactants for the present invention.

Figure 2:
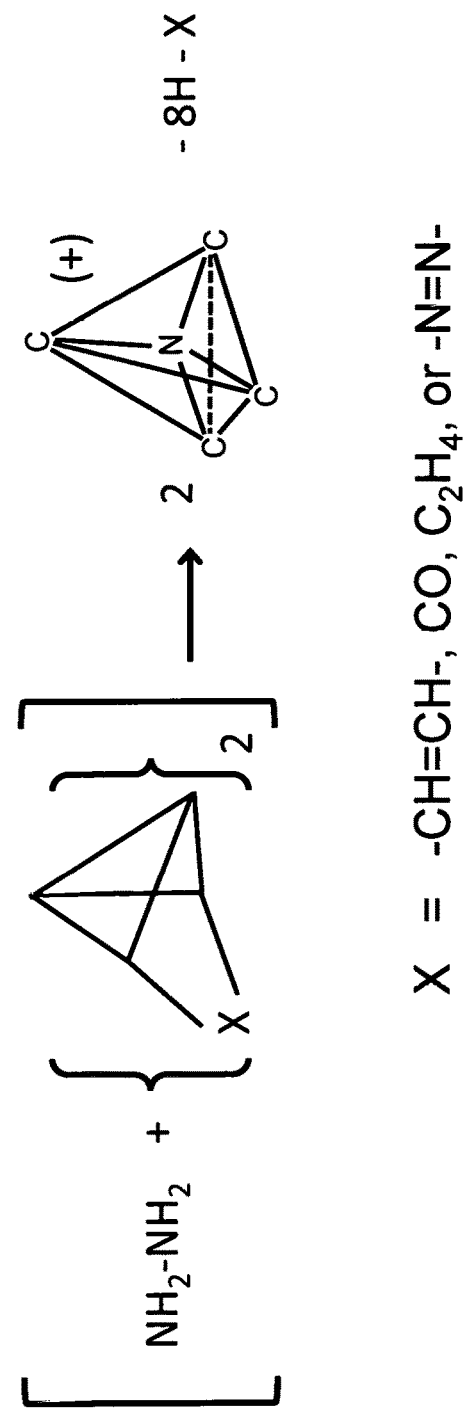
FIG. 2 illustrates a solid state reaction for producing heterodiamond using a nitrogen source and any one of four tetrahedranoidal reactants.

The diamond unit cell produced by these combinatorial reactions is a homo-penta-atomic molecule containing five carbon atoms. As this diamond unit cell contains only five carbon atoms it can be referred to as an immediate precursor to "homodiamond". While not intending to be bound by theory, it is believed that the active or excited state carbon atom inserts into the unit cell center or "cage" position. FIG. 1 illustrates the solid state homodiamond unit cell forming reaction. However, when the diamond unit cell contains a heteroatom, such as a nitrogen atom, it can be referred to as "heterodiamond". FIG. 2 illustrates the solid state heterodiamond (with N) unit cell forming reaction.

For forming homodiamond, cubane is a particularly good source of excited state carbon atoms. This is due to its high strain energy (166 kCal/mole) and favorable carbon to hydrogen ratio of 1:1. Indeed, cubane is a better carbon atom source than the customary hydrocarbons (e.g., methane, etc.) currently used in conventional CVD methods for making diamond. It yields carbon atoms uncomplicated by hydrocarbenoid impurities, which can interfere with the assembly of carbon atoms to produce diamond. As such, the rate of formation is likely to be faster than those current CVD processes that employ the customary carbon sources.

The solid state embodiments of the combinatorial synthesis reaction are of particular interest for the present invention. In the solid state, this reaction is implemented by evaporating the solvent from a homogenous solution of a carbon source molecule and a tetrahedranoidal molecule to form a homogenous solid mixture of the two reactants, which is then exposed to a high energy discharge to form a diamond mass. It is considered to be most important to maintain a preferred stoichiometric ratio between reactants to avoid, or at least reduce, formation of by-product impurities. The preferred stoichiometric ratio is determined by the number of carbon atoms in the carbon source molecule. For example, when the carbon source molecule is cubane, ⅛ of a stoichiometric amount of cubane is used relative to the stoichiometric amount of tetrahedranoidal molecule. Thus, for example, when cubane is used as the carbon source molecule and benzvalene is used as the tetrahedranoidal compound subjecting cubane to a high energy discharge, such as microwave radiation, cubane, a highly-strained molecule (166 Kcal $mol^{-1}$ strain energy), yields 8 active or excited state carbon atoms, each of which can react with a molecule of benzvalene. When this occurs, the diamond unit cell is formed and a molecule of acetylene and four (4) hydrogen atoms are ejected.

As indicated in pending U.S. application Publication No. U.S. 2016/0297683 and shown in FIG. 2, a solid state reaction can also be used to produce azadiamond, which is a "heterodiamond" characterized by a unit cell in which a nitrogen atom is substituted for one of the carbon atoms in the diamond unit cell. This reaction is similar to the "homodiamond" reaction discussed above, except that a nitrogen source, such as hydrazine, is used instead of a carbon source, such as cubane. Other nitrogen sources, such as ammonia, can also be used in the N-heterodiamond unit cell-forming reaction.

The above reactions can be used to produce particulate diamond of a large range of sizes varying from the macroscopic to the nanoparticulate. The general methodology entails preparing a solution of the reactants (e.g., either a carbon source or a heteroatom source compound, and a tetrahedranoidal molecule in a solvent) in a proper stoichiometric ratio, producing droplets of the homogenous reactant solution, evaporating the solvent of the solution droplets to form particles of solid reactant mixture, and exposing the particles of the homogenous solid reactant mixture to a high energy discharge to form particles of diamond. The size or particle diameter of the diamond particles produced is a function of two parameters: 1) the concentration of the reactants in the homogeneous solution, and 2) the size of the reactant solution droplets. Both of these parameters can be controllably varied to form different sized diamond particles.

Control of Particle Size by Droplet Size and Reactant Concentration

Reactant Concentration

It is straightforward to calculate how many diamond unit cells there are in a 1 nm sphere (particle) and a 3 nm sphere (particle). Further, molarity calculations for benzvalene solution, for example, are also straightforward. Sample calculations for such values are provided below.

The volume of a tetrahedron $(V_T)=a^3/6\sqrt{2}$, where a is a side of a tetrahedron. The volume of a sphere $(V_S)=4/3\ \pi r^2$. The radius of a carbon atom is $70 \times 10^{-12}$ m. The $sp^3$ C—C bond length is $155 \times 10^{-12}$ m. Avogadro's number $(N_A)$ is $6.02 \times 10^{23}$. To determine the number of diamond unit cells in a given spherical volume $(V_S)$ divide by the volume of a unit cell tetrahedron, i.e., $V_S/V_T$.

First, $V_T$ is calculated, where a is a side of a tetrahedron:

$$a=2\times(70\times10^{-12})+155\times10^{-12}\ m=295\times10^{-12}\ m$$

(this reflects the outer radius of each carbon atom in the C—C bond to the center of that carbon atom plus the C—C bond length for the overall value of a.)

Since $V_T=a^3/6\ \sqrt{2}=(295\times10^{-12}\ m)^3/8.49=2.57\times10^{-29}/8.49=3.03\times10^{-30}\ m^3$.

Second, calculate $V_S$ for a $1\times10^{-9}$ m diameter sphere, where $r=5\times10^{-10}$ m:

$$V_S=4/3\pi r^3=4/3\pi(5\times10^{-10})^3=5.24\times10^{-28}\ m^3.$$

Third, calculate $V_S$ for a $3\times10^{-9}$ m diameter sphere, where $r=1.5\times10^{-9}$ m:

$$VS=4/3\pi r^3=4/3\pi(1.5\times10^{-9}\ m)^3=1.41\times10^{-26}\ m^3.$$

Thus, the number of unit cells within a 1 nm sphere$\cong V_S/V_T=5.24\times10^{-28}\ m^3/3.03\times10^{-30}\cong m^3=173$ unit cells/1 nm sphere For a 3 nm sphere, $V_S/V_T=1.41\times10^{-26}\ m^3/3.03\times10^{-30}\cong m^3=4650$ unit cells/3 nm/sphere.

Calculation of Reactant Concentration to Obtain Desired Number of Unit Cells $6.02\times10^{23}$ unit cells=1 mole of diamond, thus 173 unit cells in moles=$173/6.02\times10^{23}=2.87\times10^{-22}$ moles.

Assume a 1 µl ($1\times10^{-6}$ L) droplet, for each benzvalene molecule one obtains 1 unit cell. Hence, each 1 µl droplet of reactant solution must contain $2.87\times10^{-22}$ moles of benzvalene. Thus:

$$2.87\times10^{-22}\ moles/\mu l \times 1\times10^6\ \mu l/L=2.87\times10^{-16}\ moles/L.$$

Benzvalene molar mass=78.1 g/mol. Hence, a solution may be prepared such that:

$$(2.87\times10^{-16}\ mol/L)\times78.1\ g/mol=2.24\times10^{-14}\ g/L.$$

Multiple dilution is then used to obtain the more dilute solution required to obtain a given number of unit cell product, so as to determine resultant diamond particle size. Of course, in view of the reaction stoichiometry, the cubane solution used requires $\frac{1}{8}^{th}$ the molarity of the benzvalene solution.

Droplet Size

Figure 3:
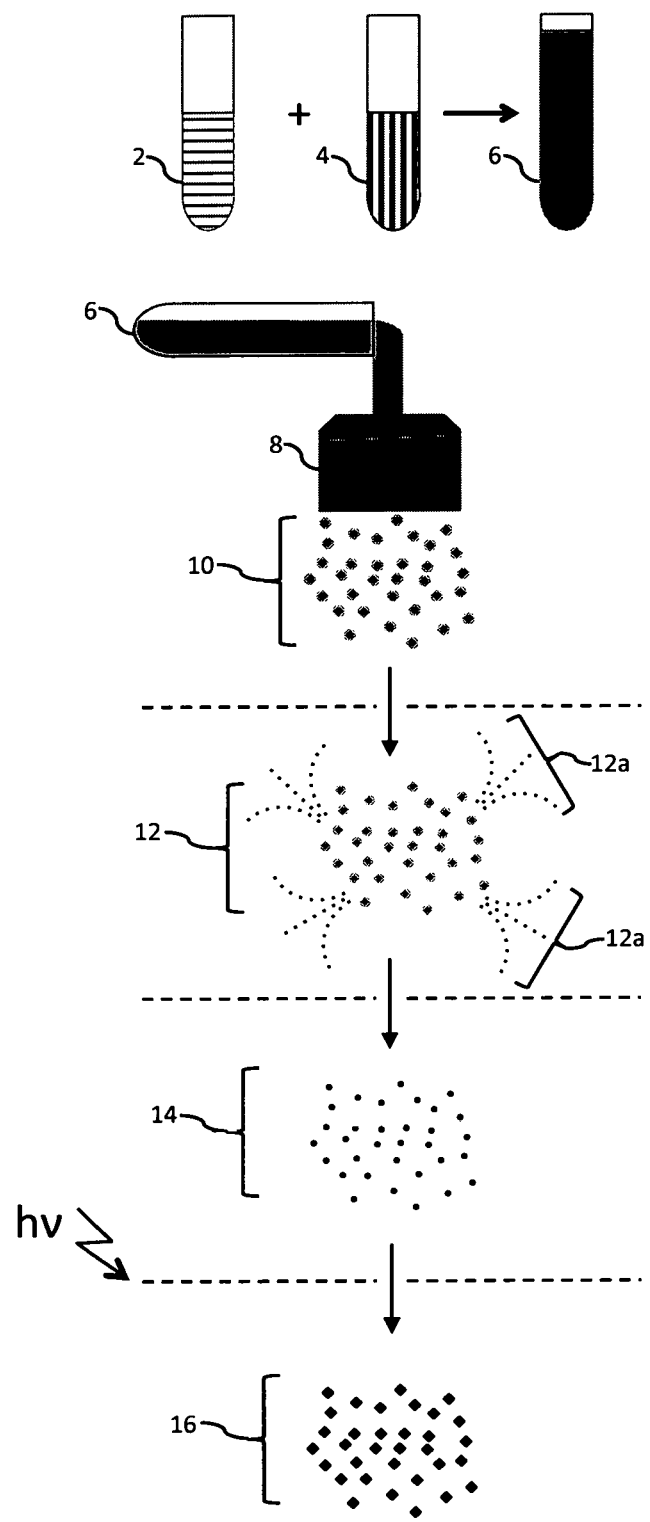
FIG. 3 is a schematic diagram of the process for making homodiamond and heterodiamond particles.

Various controllable dispensers may be used as nozzle component 8 as shown in FIG. 3. For example, any of the ultrasonic atomizing nozzles described in U.S. Pat. No. 7,712,680 B2, or the multiple horn atomizers of U.S. Pat. No. 6,669,103 B2 may be used. Further, the droplet spray may be electrostatically charged to prevent agglomeration or aggregation and controllably aid in reactant transfer and product collection. Generally, the smaller the droplet size, and/or the lower the reactant concentration in the reactant solution, the smaller the ultimate size of the homodiamond or heterodiamond particles.

The above calculations may be used for any tetrahedranoidal compound reactant with the necessary adjustments being made to account for the differing molecular weight of the tetrahedranoidal compound reactant from benzvalene. With the guidelines provided herein, one skilled in the art can produce both particulate homodiamond and heterodiamond.

Particle Size Measurement

Particle size measurement can be performed with well-established technologies for particles ranging from the macroscopic down to the microscopic and even to nanoscale particles. While advances in particle size measurement technology continue to be achieved, there are many choices available that are useful for measuring the sizes of the diamond particles of the present invention. Optical microscopy can determine the size and shape of particles down to the micrometer range. Laser diffraction methods are useful for measuring a broad particle size ranging from 2 mm down to as small as a hundred nanometers. Dynamic light scattering can also be used to measure a broad range of particle sizes from 1 micron down to as small as 1 nanometer or smaller. Other methods known in the particle size measurement art include sieving, coulter counters, and scanning and tunneling electron microscopy techniques.

Homodiamond

The solid state reaction for the combinatorial synthesis of the homodiamond unit cell is disclosed in U.S. Pat. No. 9,061,917, which is fully incorporated herein by reference. This reaction is shown in FIG. 1. The reaction begins by mixing solutions of the carbon atom source (e.g., cubane) and the tetrahedranoidal compound (e.g., benzvalene) to form a homogeneous blend of benzvalene and cubane in an 8:1, benzvalene:cubane ratio. It is important that this solution has, and maintains, high stoichiometric precision to prevent the formation of carbonaceous impurities in the diamond product due to an excess (or deficiency) of either cubane or benzvalene. Care must be taken during preparative manipulations of the homogeneous blend of reactants such that this precise stoichiometric ratio is not altered by the vapor pressures of the two blended constituents. Accordingly, the preparative manipulations and the actual reaction by exposure to a high energy discharge are conducted at temperatures that substantially prevent mass loss due to vapor pressures of the blend constituents. This solution is freed of solvent under reduced pressure and temperature. More specifically, the solutions are chilled and the solvent is slowly evaporated under reduced pressure. This leaves a homogeneous solid mixture of benzvalene and cubane in an 8:1, benzvalene:cubane ratio. This homogeneous solid mixture is then exposed to a high energy discharge from a microwave, electrostatic, or other discharge device, such as a laser, to yield a mass of particulate diamond.

As detailed in U.S. Pat. No. 9,061,917, which is fully incorporated herein by reference, the homogeneous solution of the reactants is kept at a temperature known to suppress changes in the stoichiometric precision of the reaction, i.e., loss of reactant mass due to vapor pressure of the reactants. For example, in U.S. Pat. No. 9,061,917, the temperature of the cubane/benzvalene/dichloromethane solution is kept at −45° C. Since the reaction itself can occur at ambient temperature and pressure, the vehicle gas (e.g., argon) can be provided at ambient temperature and temperature, as well. However, the temperature and pressure can be altered quickly and in real time by the system controller as needed or as indicated by sensor data such as are provided by pressure, temperature, flow and optical sensors, and GC-MS, etc. The apparatus of the present invention comprises a highly responsive feedback control system.

Heterodiamond

The solid state reaction for the combinatorial synthesis of heterodiamond unit cell is shown in FIG. 2. It is disclosed in currently pending U.S. Publication No. U.S. 2016/0297683, which is fully incorporated herein by reference in the entirety. The combinatorial synthesis of heterodiamond, such as azadiamond wherein N is the heteroatom substituted into the diamond unit cell, proceeds in a manner similar to the synthesis of the homodiamond unit cell. In this case, hydrazine is used as a nitrogen source. Following the procedures of U.S. Pat. No. 9,061,917, stock solutions of benzvalene and hydrazine (substituted for cubane) in a solvent such as diethyl ether or butane are prepared having a high degree of stoichiometric precision with respect to molar concentration. These solutions are combined in a ratio of 2:1, benzvalene:hydrazine, and the solution so obtained is freed of solvent under reduced pressure and temperature to produce the homogeneous solid reaction blend for exposure to a microwave discharge under an inert atmosphere with appropriate cooling to eliminate mass losses due to vapor pressures of the blend components. Notwithstanding that nitrogen atoms readily recombine to form dinitrogen gas, it is not recommended that the stoichiometric precision prescription be relaxed in a favor of a slight excess of nitrogen atom source for the sake of manipulative convenience as this may lead to the possibility of impurity formation. Thus, further following the procedures of U.S. Pat. No. 9,061,917, the homogeneous, combined solution of benzvalene and hydrazine is kept at a temperature of −45° C. Other forms of heterodiamond may be synthesized in a similar manner using heteroatom sources such as aluminum, silicon, and phosphorus. Generally, the hydride compounds of these elements are used as heteroatom source compounds. Thus, for example, if a phosphorus (P)-heterodiamond is desired, phosphine is used as the P-source compound. All such hydrides are commercially available.

Particulate Homodiamond and Heterodiamond

The solid state, combinatorial synthesis of the diamond unit cell is used to produce particulate homodiamond and/or particulate heterodiamond. This process is shown generically in FIG. 3. In either case, solutions of the reactants are prepared with a high degree of stoichiometric precision with respect to molar concentration. That is, for homodiamond, a homogeneous blend of benzvalene and cubane in an 8:1, benzvalene:cubane ratio and, for heterodiamond with N as the heteroatom, a homogeneous blend of benzvalene and hydrazine in a 2:1, benzvalene:hydrazine ratio. Thus, in the case of homodiamond, solution 2, can be a carbon source such as cubane, which, when mixed with solution 4, which can be a solution of a tetrahedranoidal compound such as benzvalene, to form solution 6, a homogeneous solution of benzvalene and cubane in an 8:1 stoichiometric ratio, respectively. Alternatively, in the case of heterodiamond, solution 2 can be a heteroatom (e.g., N) source such as hydrazine, when mixed with solution 4, which can be a solution of a tetrahedranoidal compound such as benzvalene, to form reactant solution 6, which is then a homogeneous solution of benzvalene and hydrazine in a 2:1 stoichiometric ratio, respectively.

Homogeneous reactant solution 6 is then provided to a droplet-forming device such as a controllable dispenser shown as spray nozzle 8 to form reactant solution droplets 10 with a predetermined size range as a spray or mist in an inert carrier gas such as argon. Alternatively, other liquid dispensers can be used to produce droplets 10. For example, a controllable pipette can be used to produce a line of discrete droplets 10. Additionally, multiple controllable pipettes can be used to produce multiple lines of discrete droplets 10. The droplets 10 may range in sizes including macroscopic and/or microscopic dimensions. Droplets can be produced with spray nozzle 8 having one or more outlets (i.e., a compound nozzle) to atomize the homogeneous reactant solution. Two-fluid nozzles can be used. For example, one fluid can be the homogeneous reactant solution and the other can be an inert carrier gas such as argon. For a particularly fine aerosol production with a controllable, narrow drop-size range, spray nozzle 8 can be an ultrasonic atomizer. Additionally, the droplet spray can be charged electrostatically to prevent agglomeration or aggregation and controllably aid in reactant transfer and product collection. Regardless of the type of controllable dispenser used, each type is used in fluid connectivity with and in the apparatus as shown for spray nozzle 8 in FIG. 3.

Once the homogeneous reactant solution droplets 10 are formed, the solution solvent is then evaporated, with evaporating droplets 12 losing solvent vapor 12a to yield solid reactant particles 14 composed of a homogeneous solid mixture of the reactants. The size of reactant particles 14 is a function of both the size of the droplets 10 and the concentration of the reactants in the reactant solution 6 that comprises droplets 10. The ultimate size of the homodiamond or heterodiamond particle formed is a function of droplet size and/or reactant solution concentration. The smaller the size of the droplets 10 and/or the lower the concentration of the reactants in the homogeneous reactant solution 6, the smaller the ultimate size of the homodiamond or heterodiamond particle. Thus, droplet size and reactant solution concentration are important control parameters for producing the homodiamond and heterodiamond particles of the present invention.

Once the reactant particles 14 of solid homogeneous reactant mixture are formed, they are subjected to a high energy discharge hv (e.g., microwave, electrostatic, laser energy, etc.), and the solid state reaction proceeds to form homodiamond or heterodiamond particles 16. Finally, these diamond particles 16 are collected. Collection of particles 16 can be done with a collector that is a particulate diamond receiving container or vessel, a solid (i.e., mechanical) conveyor or a fluid (liquid and/or gas) stream.

Figure 4A:
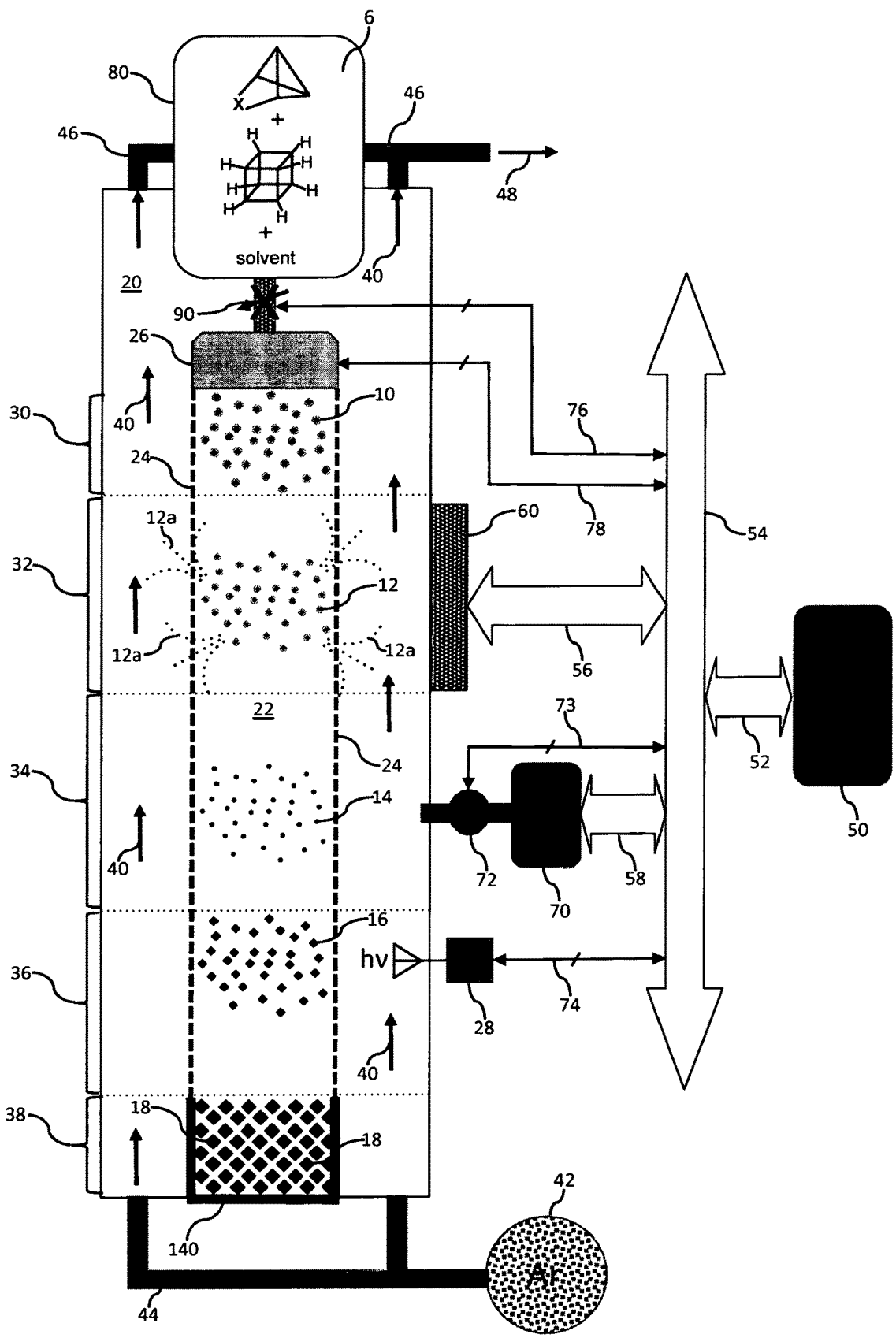
FIG. 4A is a schematic cross section of an apparatus for producing diamond particles wherein the diamond particles are formed within a gas and not on a surface.
Figure 4B:
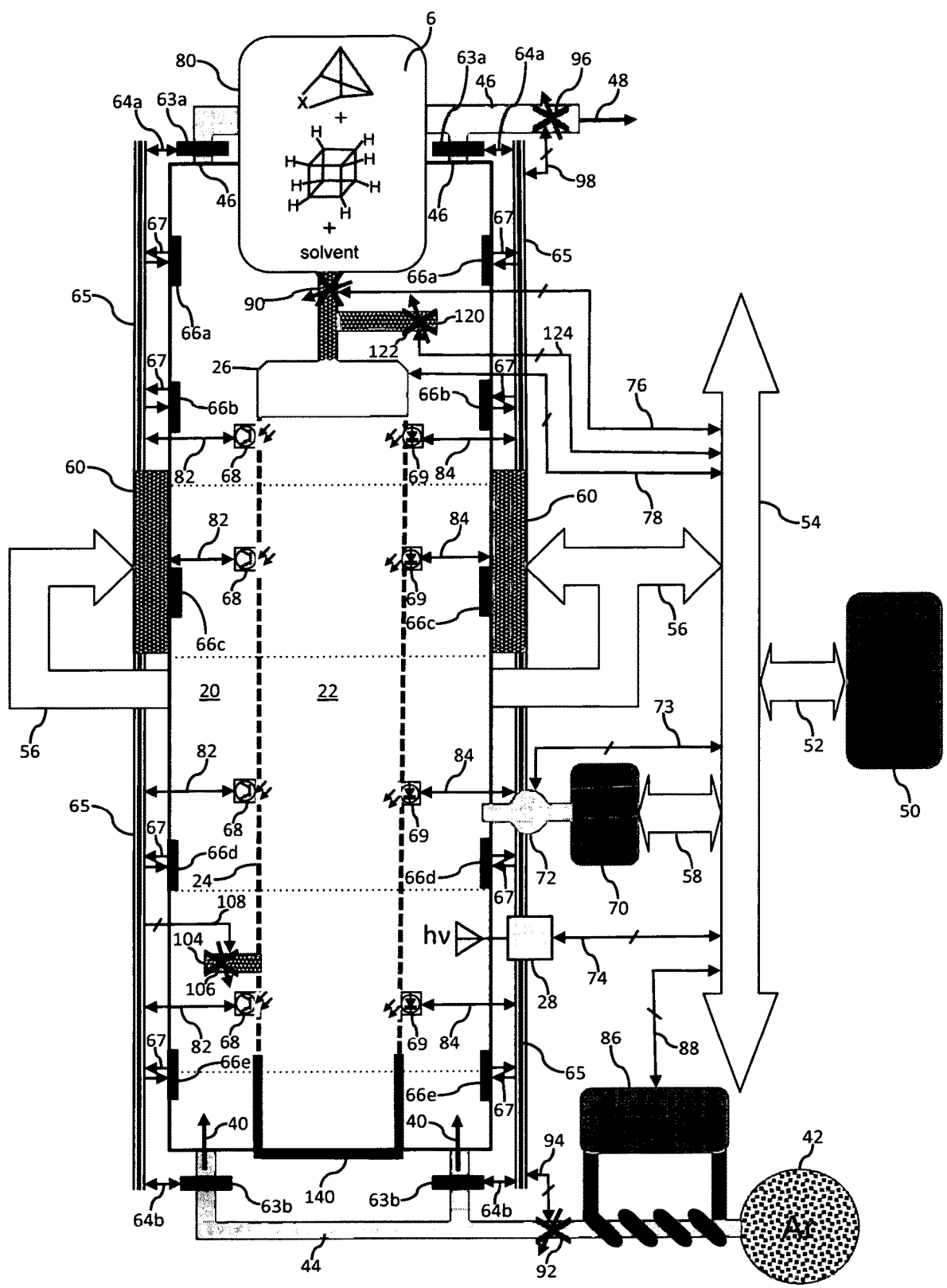
FIG. 4B, a schematic cross section of the apparatus of 4A, is a detailed depiction of the operational features of the apparatus.

FIGS. 4A and 4B, together in concert are schematics of a reactor apparatus for producing particulate diamond. FIG. 4A shows the basic operation of the apparatus as it relates to the formation of particulate diamond. FIG. 4B provides greater detail regarding the sensors, actuators, and control system of the apparatus. For the purposes of the present invention, when a line or lines connect a remote or peripheral sensor, actuator, or other device directly to main system bus 54, (or sensor and actuator bus 56, GC-MS bus 58, etc.) the interfacing electronics (e.g., receivers, drivers, amplifiers, D/A and A/D converters, etc.) are contained within the remote or peripheral device. Alternatively, interfacing electronics can be contained within system controller 50 and/or sensor and actuator suite 60.

FIG. 4A shows the apparatus configured as two spaces defined by chambers that are coaxial with each other. Outer chamber 20 encloses inner reaction chamber 22, which provides the volume within which the combinatorial synthesis of homodiamond or heterodiamond proceeds. Reaction chamber 22 is at least partially defined by membrane 24, which is permeable to the gaseous phase of the solution solvent of reactant solution droplets 10. Membrane 24 can be a solid material through which the vapor phase of the solvent of the solution solvent of reactant solution droplets 10 pass, by dissolving through the material of the membrane 24 and/or by passing through physical pores in the membrane 24. Other configurations of membrane 24 are also contemplated. For example, a series of solvent vapor-permeable tubes can be configured as a concentric barrier or boundary between reaction chamber 22 and outer chamber 20. In combination with outer chamber 20, these could function analogously to the way that dialysis tubing removes waste products from blood. Notwithstanding the configuration of membrane 24, outer chamber 20 functions to remove the vapor phase of the solvent of reactant solution droplets 10. Thus, other configurations are possible for removing solvent vapor and these can include countercurrent flow arrangements of permeable walled conduits (pipes, tubes, etc.), absorbents or adsorbents such as activated charcoal or silicone gels, etc.

Reaction chamber 22 is operationally and effectively divided into functional zones. There are no clear, sharp delineations defining these zones but, rather, extended, broad transitions between them where the diamond particle forming process moves through different stages. Reactant solution droplets 10 are provided to droplet zone 30 by the operation of a controllable dispenser shown as spray nozzle 26. Although the evaporation of reactant solution droplets 10 begins immediately, for purposes of illustration, the evaporation process of evaporating droplets 12 is shown to be occurring most clearly in evaporation zone 32. Solvent from evaporating droplets 12 is shown as outgassing solvent vapor 12a, which, due to diffusion and pressure gradient, moves from reaction chamber 22 through membrane 24 into outer chamber 20. The bulk of the solvent has evaporated from evaporating droplets 12 to become, in reactant particle zone 34, reactant particles 14. Reactant particles 14 are made up of a homogeneous solid mixture of the reactants. In high energy discharge zone 36, reactant particles 14 are subjected to a high energy discharge, hv, produced by high energy discharge source 28. As shown, in FIG. 4A, high energy discharge source 28 is a microwave generator. However, high energy discharge source 28 can alternatively be a laser, electrostatic generator, RF source, etc. Regardless, of the type of high energy discharge used, it is important that it be compatible with the materials and structure of the reactor. Thus, as shown in FIGS. 4A and 4B, the high energy discharge source 28 is a microwave generator and waveguide or antenna situated in the outer chamber 10. This assumes that the material of membrane 24 does not interfere with the energy provided to the reaction. If membrane 24 were to block, absorb, or otherwise interfere with the discharge of energy, then such a problem would be avoided by proper design of the reactor and appropriate placement of the high energy discharge source. For example, the high energy discharge could be provided directly into reaction chamber 22. When the homogeneous solid mixture of reactants in reactant particles 14 are subjected to high energy discharge hv in high energy discharge zone 36, the solid state combinatorial synthesis of the homodiamond or heterodiamond unit cell is initiated and proceeds to form particulate masses of diamond shown as diamond particles 16. The particulate diamond product 18 so formed is collected in collection zone 38.

Outer chamber 20 is provided with a flow of inert carrier gas 40 shown in FIG. 4A as argon. The arrows pointing vertically upward in outer chamber 20 depict inert carrier gas 40. Other inert carrier gases can be used (e.g., helium or other noble gases) but argon is economical and commercially available with semiconductor purity. Carrier gas source 42 provides carrier gas (e.g., argon) to outer chamber 20 through carrier gas conduit 44. Flow of carrier gas 40 is provided by carrier gas source 42 and this gas flow can be controlled by a pump, a regulator (e.g., in communication with a gas tank), or both (these are not shown). Carrier gas 40 leaves outer chamber 20 as effluent 48 (represented by a horizontal, right pointing arrow) through carrier gas exit port 46. When carrier gas 40 leaves through carrier gas exit port 46, it also contains solvent vapor 12a that has evaporated from evaporating droplets 12. At this point, carrier gas 40 can be collected for purification and reuse.

To facilitate solvent evaporation, outer chamber 20 and inner reaction chamber 22 are preferably kept at reduced pressure, that is, sub-atmospheric pressure. Both the pressure and temperature maintained and controlled within the apparatus of the present invention are chosen according to the boiling point of the solvent, its vapor pressure, and the vapor pressure of the reactants. If extreme purity is desired such as, for example, for semiconductor or quantum applications, maintaining strict stoichiometric ratios of the reactants is necessary. Thus, a balance must be maintained between conditions that facilitate solvent evaporation and conditions that preserve the stoichiometry of the reactants in view of their vapor pressures. The ultimate control of reaction parameters and apparatus function is achieved with system controller 50, which can be a dedicated computer, embedded microcontroller, or other programmable digital device well known in the art. Sensor and actuator suite 60 can directly control parameters and system function through the use of temperature sensors, pressure sensors, flow sensors and actuators, which can include, for example, digitally controllable valves, pumps, and heating/cooling mechanisms well known in the art. Sensor and actuator suite 60 communicates bi-directionally with system controller 50 through sensor and actuator bus 56, main system bus 54, and system controller bus 52. Although sensor and actuator suite 60 is shown as a single, integrated module at one location, alternatively, the sensors and actuators can be placed at disparate locations in the system.

GC-MS 70 (gas chromatograph in tandem with a mass spectrometer) is an important control feature of the present invention. GC-MS 70 communicates through to system controller 50 via GC-MS bus 58, which is connected to system bus 54, which is in turn connected to system controller bus 52. Sampling pump 72 may be separate from or integrally a part of GC-MS 70. Sampling pump 72 is controlled by sampling pump line 73, which is controlled by system controller 50 via system controller bus 52 and system bus 54. (For the purposes of the present invention, the word "line" singular can be taken to mean either one or more lines) GC-MS 70 is used by the system to sample carrier gas 40 to determine the degree to which solvent vapor extracted from evaporating droplets 12 has been flushed from the system. This data is important because it allows the system controller to monitor the state of the process. For example, when it is determined that solvent has sufficiently evaporated and been flushed from the system as effluent, reactant particles 14 are now ready to be subjected to a high energy discharge, hv. Thus, high energy discharge source is actuated through discharge source control line 74, which connects through to the system controller via system bus 54 and system controller bus 52.

For purposes of illustration, the apparatus in FIGS. 4A and 4B is shown adapted to the production of homodiamond particles. Thus, the reactant solution in reactant source reservoir 80 comprises a tetrahedranoidal compound (such as benzvalene) and cubane as a carbon atom source both dissolved in a solvent such as dichloromethane or butane. For the production of heterodiamond particles, for example, azadiamond particles, the solution can be comprised of a tetrahedranoidal compound (such as benzvalene) and a heteroatom source (such as hydrazine) both dissolved in a solvent (e.g., butane, dichloromethane, etc.).

The reactant solution in reactant source reservoir 80 is provided to spray nozzle 26 through reactant source valve 90, which is controlled by system controller 50 via valve control line 76, which is connected to system controller 50 through main system bus 54 and system controller bus 52. The reactant solution in reactant source container 80 can be provided to spray nozzle 26 as a controlled continuous flow or with a pulsatile (single or multiple pulses) or other waveform. In FIG. 4A, the reactant solution droplets 10, evaporating droplets 12, reactant particles 14, and diamond particles 16 are shown as a single "puff" or "cloud" that proceeds down through inner reaction chamber 22. Alternatively, these can be a continuous flow of material or modulated/metered flow quantities under the control of reactant source valve 90 and/or spray nozzle 26. Spray nozzle 26 is actuated by nozzle control line 78, which is connected to system controller 50 through main system bus 54 and system controller bus 52.

Reaction chamber 22 can be flushed with carrier gas 40 by closing reactant source valve 90 and opening carrier gas access port 120 by the actuation of gas access port valve 122, which is controlled by system controller 50 via gas access port valve control line 124, which is connected to system controller 50 through main system bus 54 and system controller bus 52. Simultaneously, reaction chamber exit port 104 is opened by the actuation of reaction chamber exit port valve 106 which is connected to system controller 50 by reaction chamber exit port control line 108 through sensor/actuator cables 65, which connect to the sensor and actuator suite 60, and the sensor and actuator bus 56, and the other buses as detailed above. This can serve two functions. First, it can be used to purge the reaction chamber of reactant particles 14 and solvent vapor 12a. Second, it can be used to propel particulate diamond product 18 into collector 140.

To further illustrate the function of the particulate diamond producing apparatus, it is useful to consider the particulate forming process shown in FIG. 3 together with the apparatus structure shown schematically in FIG. 4A. The process of FIG. 3 is effectuated by the apparatus of FIG. 4A and both figures share, in common, several item numbers. The reactant mixture produced by combining reactants of solution 2 (e.g., cubane in a solvent) and solution 4 (e.g., benzvalene in a solvent) to form a homogeneous solution of both reactants in a solvent shown as reactant solution 6. In FIG. 4A, reactant solution 6 is shown contained within reactant source reservoir 80, which communicates through to spray nozzle 26, the equivalent of spray nozzle 8 in FIG. 3. Spray nozzles 8 and 26 of both FIGS. 3 and 4A, respectively, produce reactant solution droplets 10, which, as evaporating droplets 12, proceed to lose solvent vapor 12a. In the apparatus of FIG. 4A, reactant solution droplets 10 move down reaction chamber 22, and the evaporated solvent is moved through permeable membrane 24 and is removed by carrier gas 40 flowing up through outer chamber 20. Further along in the process, reactant particles 14 are free of solvent and are composed of a stoichiometric mixture of the two reactants in the solid state. Upon exposure to a high energy discharge emanating from high energy discharge source 28 of FIG. 4A, the chemical reaction occurs and diamond particles 16 are formed. Shown in FIG. 4A, but not in FIG. 3, is the final, collection stage of the process wherein particulate diamond product 18 is collected in collector 140. Collector 140 may be removed from the bottom of reaction chamber 22 to allow removal of the particulate diamond product. It may contain a liquid or gas fluid or a solid or gel to aid in particle collection and to inhibit potential clumping, agglomeration, or aggregation of particulate diamond product. For example, in U.S. Pat. No. 9,096,438, Park et al. disclose a metal hydride dispersion solution and its use for dispersing or de-aggregating nanodiamond. Other de-aggregation techniques include using ultrasound energy applied with or without a chemical dispersant to separate particles. In U.S. 2015/0038593, Gogotsi et al. disclose the disaggregation of aggregated nanodiamond clusters using a milling process and, in some embodiments, also a salt as a disaggregating agent.

Collector 140 may be configured alternatively as a different structure such as a conveyor belt or fluid (gas and/or liquid) stream disposed beneath a port provided in the bottom of reaction chamber 22. These would convey particulate diamond product 18 away from the particulate diamond-producing apparatus to a product storage area or further processing apparatus.

FIG. 4B provides for a more detailed, extended description of the operation of the same particulate diamond-producing apparatus of FIG. 4A.

Sensor/actuator cables 65 originate from each sensor and actuator suite 60 and extend throughout the apparatus. Sensor/actuator cables 65 can include wires, optical fibers or a combination thereof. Unless shown otherwise, sensors and actuators of the apparatus connect through to system controller 50 via the sensor and actuator suite 60, which interfaces with sensor and actuator bus 56. Sensor and actuator bus 56 communicates through to system controller 50 via main system bus 54 and system controller bus 52. Interfacing electronics for sensors and actuators that connect to sensor and actuator suite 60 through sensor/actuator cables 65 are generally contained within sensor and actuator suite 60.

Carrier gas 40 flow is controlled by carrier gas source valve 92 and effluent valve 96, which connect respectively to sensor/actuator cables 65 through carrier gas source valve control line 94 and effluent control valve line 98. Carrier gas 40 is provided by carrier gas source 42 and, as shown in FIG. 4A, the carrier gas is argon. Typically, carrier gas source 42 is a high pressure tank. Pressure within the apparatus is regulated by carrier gas source valve 92 in combination with effluent valve 96. Although not shown, pressure may be produced and regulated alternatively or additionally with a pressure pump and/or vacuum pump under the control of the system controller 50. For example an effluent pump (not shown) and an inlet pump (not shown) can operate in concert to maintain reactor pressure at less than ambient pressure when such is desired. Pressure within the apparatus is monitored by pressure sensors 66c, which are shown connected directly to actuator suite 60, through which they communicate pressure data to system controller 50 via sensor and actuator bus 56, main system bus 54 and system controller bus 52. System controller 50 communicates with carrier gas source valve 92 and effluent control valve 96 via system controller bus 52, main system bus 54, sensor and actuator bus 56, sensor and actuator suite 60, cables 65 through to carrier gas source valve control line 94 and effluent control valve line 98. This configuration provides for a programmable, responsive closed loop control of pressure within the apparatus.

Temperature within the apparatus is a function of the temperature of the carrier gas, which is regulated by temperature controller 86. Temperature controller 86 can be any of a number of commercially available flow-through heat exchangers that are available commercially where a refrigerant is used to regulate the heat of a flowing fluid, which, in the case of the present invention, is carrier gas 40. Temperature controller 86 connects through to system controller 50 via temperature controller lines 88, main system bus 54 and system controller bus 52. Temperature sensors 66a and 66e connect through to the system controller through sensor/actuator cables 65, sensor and actuator suite 60, sensor and actuator bus 56, main system bus 54 and system controller bus 52. This configuration provides for a programmable, responsive closed loop control of temperature within the apparatus.

Carrier gas 40 flow through the apparatus is monitored by carrier gas exit port flow sensors 63a, carrier gas input flow sensor 63b, and flow sensors 66b and 66d. These sensors connect through to the system controller via sensor/actuator cables 65, sensor and actuator suite 60, sensor and actuator bus 56, main system bus 54 and system controller bus 52. Carrier gas exit port flow sensors 63a, carrier gas input flow sensor 63b, connect to cables 65 with exit port flow sensor lines 64a and gas input flow sensor lines 64b, respectively. Flow sensors 66b and 66d connect to cables 65 with sensor control lines 67. Flow sensor data provided to system controller 50 can be used to provide further control over carrier gas 40 pressure and flow. This configuration provides for a programmable, responsive closed loop control of temperature within the apparatus.

The particulate diamond forming process of the present invention can be monitored in a variety of ways known in the art. In the embodiment of FIGS. 4A and 4B, optical sensing is provided and implemented as an LED/phototransistor pair. Thus, in FIG. 4B, LED light source 69 directs light through reaction chamber 22 to phototransistor 68. LED light source 69 and phototransistor 68 connect through to the system controller via light source lines 84 and photodetector lines 82, respectively, and then sensor/actuator cables 65, sensor and actuator suite 60, sensor and actuator bus 56, main system bus 54 and system controller bus 52. As the particulate diamond process proceeds through its various stages, the size and content of the droplets and, then, particles, change, causing a concomitant change in their optical properties including, for example, light dispersion, index of refraction, reflection and diffraction. These changes are detected by the LED/phototransistor pair thus providing for a real time monitoring of the particulate diamond formation. This information allows for further control of the process of the present invention. Alternatively, a laser may be used in place of led light source 69 and the light scattering characteristics and other optical properties of the droplets and particles can be monitored to indicate and thereby, control, the progress of particulate diamond formation.

Another way to monitor the progress of the diamond formation optically is by use of a microscopic video imaging system and by the exertion of control based on image analysis of the droplets or particles per se, or of the aggregate cloud formed thereby.

Infrared or other spectroscopy can also be used. The chemical characteristics of the droplets and particle change as they progress through the diamond particle forming process. The spectrum of a droplet will include information relating to the presence of the solvent. When the solvent evaporates to form a particle composed of the homogeneous solid mixture of reactants, this spectrum will be different from that of the droplet. Finally, the spectrum of the particulate diamond will be different from the spectrum of the particulate homogeneous solid mixture of reactants, Although optical devices are preferred, similar measurements can be made using sonic and ultrasonic sensors and actuators. For example, sound propagation through different stages of the system will be affected by the nature of the droplets and particles. Piezoelectric sensing means may also be used, and these can be based on piezoelectric crystals or polymers or alternatively a surface acoustic waveguide. These can be chosen such that changes in the chemical and physical environment cause variations in the frequency and/or phase behavior of the device.

Another way to sense the progress of the diamond forming process is to provide a series of conduits at different positions along the length of the reaction chamber 22 that convey small amounts of the droplets and particles for analysis by GC-MS 70. This would require controllable valves that would switch on and off depending upon the region of the chamber 22 to be tested. Regardless of the monitoring means used, it is important that it be non-invasive, or at most, minimally invasive. That is, it should not interfere with the process itself.

The apparatus of the present invention as shown in the embodiment of FIGS. 4A and 4B provides redundancy of sensors and actuators. Fewer sensors and actuators can be used but, as shown in the Figures, the redundancy provides for a more responsive system, particularly with respect to transient flow, temperature and/or pressure changes as will occur when the system has yet to achieve, or is coming out of, a steady-state equilibrium.

Figure 5:
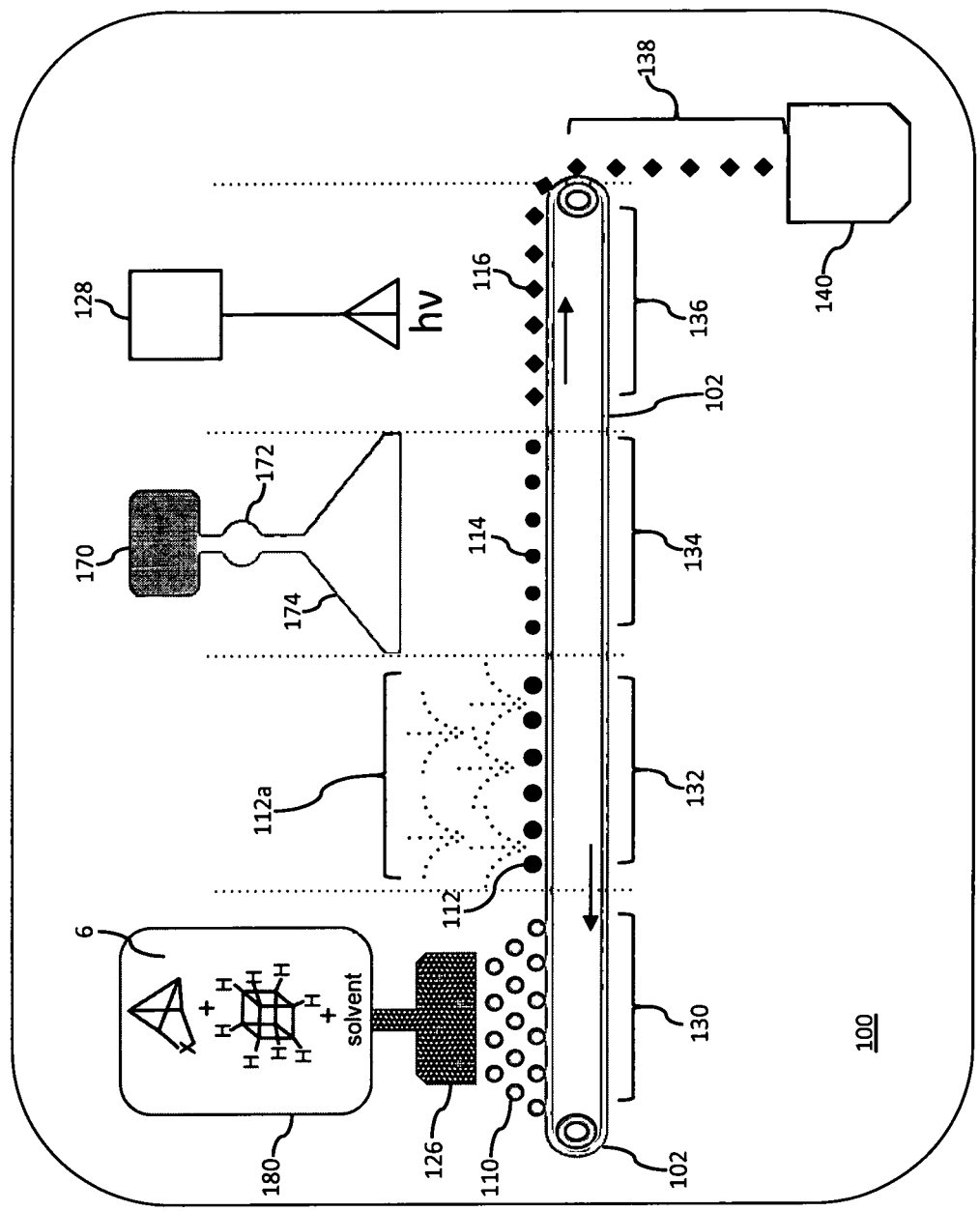
FIG. 5 shows an apparatus for producing diamond particles that uses a conveying mechanism that can hold a substrate or work piece or can be the substrate or work piece itself.

FIG. 5 is a drawing of an alternative embodiment of the present invention. Reaction chamber 100, has effectively the same control system, and similar buses, control lines, valves, sensors and actuators, etc. as shown in the embodiment of FIG. 4B, but for simplicity, these are not shown in FIG. 5. It is also adapted to maintain the previously specified reaction conditions for the unit cell syntheses. That is, the same or similar temperature and pressure conditions, carrier gas and carrier gas flows, etc. are implemented by the embodiment of FIG. 5. Additional controls are assumed but not shown for controlling moving aspects of the embodiment of FIG. 5. Contained within reaction chamber 100 is conveying mechanism 102 such as a conveyor belt moving in the direction shown by the horizontal arrows. The conveyor belt can be completely or partially made of a material to which diamond particles will not adhere such as polytetrafluoroethylene (PTFE) or similar material. That is, the diamond particles are free of any other material and, thus, non-adherent and removable.

If a conveyor belt material to which diamond adheres is used, then a means can be implemented for removal of the diamond particles. For example, if the material is an elastic polymer, the diamond can be removed by stretching the polymer at the location where removal is desired. Alternatively, chemical and/or mechanical means can be used. These might include a scraper for removing particles from the conveyor or a high velocity fluid (liquid or gas) jet to wash particles off the conveyor. A chemical removal means might include dissolving the conveyor material with a chemical agent to which diamond is inert.

For purposes of illustration, the apparatus of FIG. 5 is shown adapted to the production of homodiamond particles. Thus, the reactant solution in reactant source reservoir 180 comprises a tetrahedranoidal compound (such as benzvalene) and cubane as a carbon atom source both dissolved in a solvent such as dichloromethane or butane. For the production of heterodiamond particles, for example, azadiamond particles, the solution can include a tetrahedranoidal compound (such as benzvalene) and a heteroatom source (such as hydrazine) both dissolved in a solvent (e.g., butane, dichloromethane, etc.). The reactant solution in reactant source reservoir 180 is provided to spray nozzle 126, which sprays reactant solution droplets 110 onto droplet zone 130 of conveying mechanism 102. Conveying mechanism 102 moves reactant solution droplets 110 to evaporation zone 132 where evaporating droplets 112 outgas solvent vapor 112a. As evaporating droplets 112 move into reactant particle zone 134, solvent has largely evaporated to yield reactant particles 114, each of which comprises a solid, homogeneous mixture of the reactants. At this point, absence of solvent is verified by GC-MS 170 (gas chromatograph in tandem with a mass spectrometer). Any residual solvent vapor moves into sampling port 174, through sampling pump 172 and then provided to GC-MS 170 for analysis. If a significant amount of solvent vapor 112a remains, conveying mechanism 102 can be slowed or stopped to allow more complete evaporation and drying of reactant particles 114. When reactant particles 114 are sufficiently free of solvent, they are conveyed to high energy discharge zone 136, where, upon exposure to a high energy discharge, the solid state reaction proceeds and diamond particles 116 are formed. Diamond particles 116 are then transported through collection zone 138 into collector 140.

As shown, the apparatus in FIG. 5 produces particulate homodiamond and heterodiamond in which the particles are free from a substrate because they are reacted upon a surface to which diamond does not adhere, such as PTFE. Various mechanisms can be used to remove the particles from the conveyor such as a gas jet, an electrostatic field, the use of a resilient material that is stretched at the end of the conveyor to free the particles, etc.

The apparatus of FIG. 5 can also be adapted to deposit diamond particles upon a surface such as a substrate or work piece. In this case, the material or object upon which it is desired to deposit diamond particles is transported by conveying mechanism 102 through processing zones 130 through 138, beginning with droplet zone 130 where spray nozzle 126 directs solution droplets 110 onto the desired targeted region of the material or object.

Figure 6:
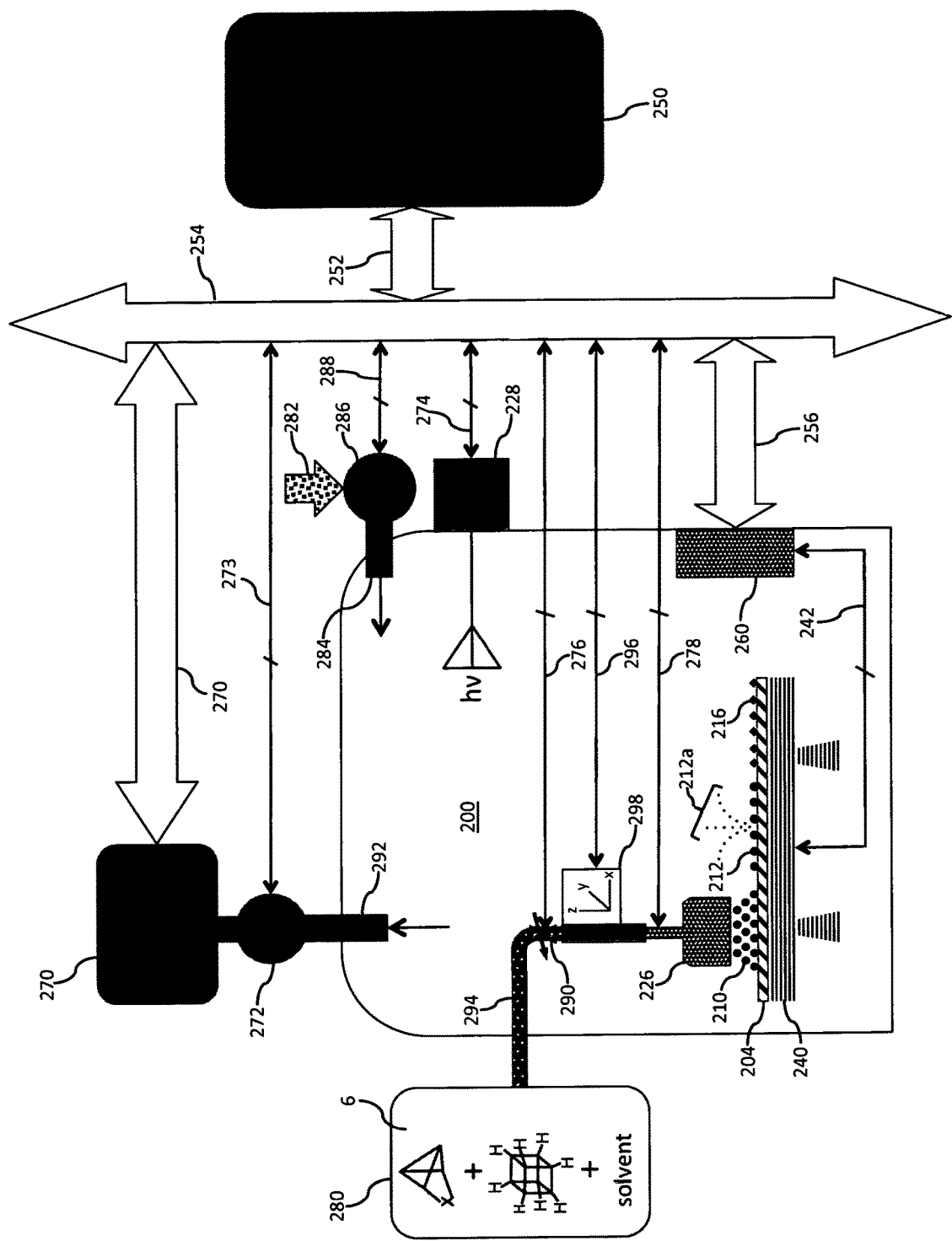
FIG. 6 shows another apparatus for producing diamond particles on a substrate or work piece.

FIG. 6 shows an alternative embodiment with an apparatus adapted to deposit diamond particles upon a substrate or work piece. Deposition chamber 200, has effectively the same control system, and similar buses, control lines, valves, sensors and actuators, etc. as shown in the embodiment of FIG. 4B, but for simplicity, not all of these are not shown in FIG. 6. It is also adapted to maintain the previously specified reaction conditions for the unit cell syntheses, that is, the same or similar temperature and pressure conditions, carrier gas and carrier gas flows, etc. are implemented by the embodiment of FIG. 6. Additional controls are assumed but not shown for controlling moving aspects of the embodiment of FIG. 6.

Examples of substrates or work pieces may include, but are not limited to, cutting tools (e.g., drills, compacts, knives, saws), grinders, cook ware, and semiconductor wafers.

Deposition chamber 200 provides a controlled environment specifically intended to maintain the physical and chemical conditions conducive to the production of molecular diamond particles (i.e., particles with diamond masses made from homodiamond unit cells or heterodiamond unit cells) that are intended to be adhered to a surface. As shown, work piece holder 240 supports deposition substrate 204. Although only one work piece holder 240 is shown, a plurality of work piece holders with associated deposition substrates in a single deposition chamber 200 can be accommodated by the present invention. Work piece holder 240 includes a means for locally controlling the temperature and charge of the deposition substrate 204, the details for which are not shown. Temperature control lines 242 communicate data to and from the system controller 250 through sensor and actuator suite 260, through sensor and actuator bus 256, main system bus 254, and system controller bus 252.

Sensor and actuator suite 260 contains one or more temperature sensors and one or more pressure sensors. It can accommodate additional sensors. Although sensor and actuator suite 260 is shown as a single, integrated module at one location in deposition chamber 200, alternatively, the sensors can be placed at disparate locations within deposition chamber 200. Sensor and actuator suite 260 communicates data to and from the system controller 250 through sensor and actuator bus 256, main system bus 254, and system controller bus 252.

Inlet port 284 provides for an inflow of inert carrier gas 282. The pressure in deposition chamber 200 may be established and regulated by inlet pump 286 under the control of inlet pump control lines 288 and/or by effluent port 292. Pressure may range from below atmospheric pressure to above atmospheric pressure. Inlet pump 286 may be provided with a dedicated flow sensor or sensors (preferably non-contact sensors) and/or pressure sensors that are not shown. Inlet pump control lines 288 communicate with system controller 250 through main system bus 254 and system controller bus 252. It is also possible to maintain desired flow and pressure in deposition chamber 200 using the pressure of the inert carrier gas 282 storage tank and its regulator alone, making the inlet pump 286 unnecessary.

Effluent leaves deposition chamber 200 through effluent port 292. As shown, effluent pump 272 controls flow of effluent from deposition chamber 200. Effluent pump 272 and inlet pump 286 operate in concert to maintain deposition chamber 200 pressure at less than ambient pressure when such is desired. However, there may be circumstances when effluent pump 272 is not used, and, thus, effluent exits deposition chamber 200 through effluent port 292 passively (e.g., due to the pressure) but through a controllable valve (not shown). Effluent pump 272 connects through to GC-MS 270 (gas chromatograph in tandem with a mass spectrometer) for effluent analysis. Effluent pump 272 may be separate from, or integrally a part of, GC-MS 270. When separate from mass GC-MS 270, effluent pump 272 is controlled by the system controller 250 through effluent pump control lines 273. When integrally a part of GC-MS 270, effluent pump 272 may be directly or indirectly controlled through GC-MS bus 270, which connects communicatively through to system controller 250 through main system bus 254 and system controller bus 252.

As shown, the apparatus in FIG. 6 is configured to produce homodiamond particles on a substrate because the homogeneous reactant solution in reactant source reservoir 280 comprises, respectively, a stoichiometric, 8:1 mixture of a tetrahedranoidal compound (e.g., benzvalene) and cubane (as the carbon source) in a solvent such as butane. If it is desired to produce heterodiamond particles on a substrate, for example, azadiamond, the homogeneous reactant solution in reactant source reservoir 280 could be, respectively, a stoichiometric, 2:1 mixture of a tetrahedranoidal compound (e.g., benzvalene) and hydrazine as a nitrogen source in a solvent such as butane.

The homogeneous reactant solution in source reservoir 280 is provided to spray nozzle 226 via reactant solution conduit 294 through reactant source valve 290. Spray nozzle 226 is controlled by nozzle control line 278, which connects through to system controller 250 via main system bus 254 and system controller bus 252. Valve 290 is controlled through valve control line 276, which connects through to system controller 250 via main system bus 254 and system controller bus 252. The relative position of spray nozzle 226 is controlled by three dimensional position controller 298 (details not shown). Three dimensional position controller 298 is, in turn, controlled by position control lines 296, which communicate through to the systems controller 250 through main system bus 254 and system controller bus 252. A single deposition chamber 200 can also accommodate multiple spray nozzles.

In FIG. 6, substrate 204 is shown with discrete material at different stages of the synthesis process. The first part of the process for forming particulate diamond on a substrate is shown at the left of substrate 204. Here, spray nozzle 216 sprays reactant solution droplets 210 upon substrate 204 and the process proceeds thereafter. In the middle of substrate 204 are evaporating droplets 212 with solvent vapor 212*a* shown emanating from droplets 212. Solvent vapor 212*a* exits reaction chamber 200 with inert carrier gas 282 through effluent port 292. Evaporating droplets 212 become particles comprising a reactant mixture that is solid and homogeneous, i.e., reactant particles (not shown). When these reactant particles are exposed to a high energy discharge such as microwaves from high energy discharge source 228, the reaction proceeds and particulate diamond is formed. Discharge source 228, is controlled by discharge source control line 274, which communicates through to the systems controller 250 through main system bus 254 and system controller bus 252. Deposited on the right of substrate 204 are diamond particles 216, which are the final product of the combinatorial synthesis used to produce particulate diamond.

Reaction chamber 200 provides a controlled environment specifically intended to maintain the physical and chemical conditions conducive to the production of particulate molecular diamond (i.e., the homodiamond unit cell and the heterodiamond unit cell) to yield useful, shapeable diamond masses that can be components of products or products themselves. These shapeable diamond masses can result from the repeated, directed deposition of particles onto deposition substrate 204 by spray nozzle 226, which can be positioned three-dimensionally by three dimensional position controller 298. Alternatively, spray nozzle 226 can be a dispenser that dispenses a single drop at a time similar or equivalent to dispensing device 430 shown in FIG. 10 of U.S. 2015/0259790.

In embodiments where the reactant solution droplets are dispensed or deposited on surfaces, the morphology of the particulate diamond can be influenced by the interaction between the nature of the droplet solvent and the surface upon which it is dispensed or deposited. For example, such surfaces would be the surface of conveying mechanism 102 in FIG. 5 and deposition substrate 204 in FIG. 6. If the both the solvent and surface are hydrophobic/oleophilic, or both the solvent and surface are hydrophilic/oleophobic, i.e., similar polarities, the structure of the resulting diamond particle is likely to be more planar. In contrast, if the solvent is hydrophobic/oleophilic and the surface is hydrophilic/oleophobic, or the solvent is hydrophilic/oleophobic and the surface is hydrophobic/oleophilic, i.e., opposing polarities, the resulting diamond particle is likely to be more spherical. In selecting materials for the apparatus of the present invention, it is important to avoid those that can react with components of the combinatorial process such as, for example, certain plastics that can outgas contaminants. Material components of the apparatus are chosen so as not to erode and breakdown but, rather, to be durable and chemically inert. For example, to avoid carbon contaminants, carbon-based polymers are undesirable and their use as apparatus components should be minimized. However, in comparison to CVD and HPHT systems, the milder reaction conditions of the present invention allow for a much greater range of materials that can be selected for constructing the apparatus.

Membrane 24 of FIGS. 4A and 4B is chosen to be permeable to the vapor phase of the (i.e., volatilized) solvent used in the reaction solution 6. For example, polydimethyl siloxane and various modifications thereof are permeable to many organic solvent vapors, and this is proportional to the Henry's Law constant of the solvent, which essentially dissolves through the polymer.

Membrane 24, however, can even be a very fine mesh constructed, for example, of porous glass, PTFE, ceramic, or other membrane with physical pores. It is preferred to choose a mesh whose pore size is scaled to the size of the particle being produced. The important consideration is to choose a membrane that facilitates the removal of reaction solution solvent without disrupting the movement of droplets and particles through the various stages of particulate diamond formation. This is done in view of what, in FIGS. 4A and 4B, is shown as a countercurrent movement of reaction materials in reaction chamber 22 as opposed to the upward flow of carrier gas in outer chamber 20.

The reactor of the present invention can be constructed of glass, but other materials such as quartz, ceramic, or stainless steel (with glass or quartz windows) or aluminum can be contemplated for use. Inner metal surfaces of the reactor can be passivated with platinum or palladium, as is well known by those with ordinary skill in the art. Given the relatively mild conditions of the present invention compared to other systems that produce particulate and nanodiamond (e.g., detonation nanodiamond reactors), even a PTFE lining can be used.

The mechanical, electronic and software aspects of the present invention are constructed with a strong emphasis on modularity. This facilitates cleaning, maintainability, repair, and parts replacement. It also yields a system that can be modified easily to produce particulate diamond with a wide range of specification options. For example, it may be desired to do a first production run of macroscopic diamond particles followed by second production run of microscopic or nanodiamond particles. This might be just a matter of removing, for example, spray nozzle 26 and replacing it with another one that produces smaller droplets of reactant solution 6 with a more dilute reactant concentration. Operational parameters (i.e., for sensors and actuators) can be selected within the system controller 50 through a graphical user interface to control the production of the second production run.

The Control System

The control system of the apparatus embodiments of the present invention comprises a computer system in combination with hardware interfaces for sensor input data and output control signals for actuators. When lines are shown directly interfacing between a bus and a peripheral device such as a sensor, actuator, transducer or valve, it should be assumed that the interfacing electronics is contained within the housing of the peripheral device. Control system software for the computer is designed with a modular structure, although other schemes are also possible. Process control can employ previously determined, preferred parameters that are stored in memory maps for use with process control strategies such as closed-loop, fuzzy logic, etc., which are commercially available. Generally, data are received from sensors in the apparatus and processed by the control system. When data indicate that a specific parameter's value has diverged from the desired set point, control signals are generated by the computer and routed through the control system interface to actuators of the apparatus. These signals correct for the difference between the actual measured parameter value and the target or desired value for that parameter.

Thus, for example, the internal temperature and pressure of a reaction chamber can be set to preferred values by adjusting the inert carrier gas temperature and/or flow rate based on the data received from temperature and pressure sensors. The inert carrier gas can be, for example, argon gas with less than three parts per million $O_2$, which is commercially available. Thus, the gas entering a reaction chamber first passes through a refrigeration device that includes a pump and one or more heat exchangers. The temperature of the inert gas is controlled by varying the heat exchanger's refrigerant temperature, which is managed by the system controller. The reaction chamber temperature is measured by one or more temperature sensors and the temperature data are provided to the system controller. One temperature sensor can be placed on a wall of the reaction chamber. Another one or two can be placed on or near the gas input port or ports of the reaction chamber. Depending on the embodiment, temperature can also be measured with a temperature sensor disposed on or near the reactant spray nozzle. If additional temperature control is desired, the substrate or work piece holder that holds the deposition substrate or work piece can be placed in intimate contact with a dedicated heat exchanger for heating and cooling the deposition substrate or work piece. Such a dedicated heat exchanger can have its own thermal fluid that is separate from that of the inert carrier gas heat exchanger. Such apparatuses and their associated control systems are commercially available. The associated control system of the substrate heat exchanger is under the command and control of the system controller.

The pressure in a reaction chamber can be controlled over a wide range of values from fractions of an atmosphere up to many atmospheres. This is achieved by a combination of options that include using the high pressure of the inert gas in its storage cylinder or tank (passive pressure control) and/or an additional pressure pump in combination with a vacuum pump at the effluent port of the reaction chamber (active pressure control). Typically, when pressurized gas from a high pressure tank is provided to the reaction chamber or deposition chamber, it flows through a gas pressure regulator, which provides a "step-down" in pressure as a first order of pressure control. Additional control is achieved through the use of a pressure sensor or sensors that are disposed within the reaction chamber. For example, one pressure sensor can be placed on the reaction chamber wall but local to the general particle deposition area. In the placement of sensors, care is taken to avoid gas currents. If the reaction is performed at sub-atmospheric temperatures, a vacuum pump is used to maintain the lower pressure at the same time that inert gas continues to flow into the reaction chamber. If the reaction is performed above atmospheric pressures, passive pressure control (e.g., regulated tank pressure) and/or in combination of passive and active pressure control can be used. A valve can be used at the effluent port to control egress of the effluent gas.

Regardless of the pressure conditions chosen, flow into, through, and out of a reaction chamber or deposition chamber is maintained. By manipulating the gas regulator, inert carrier gas pump, vacuum pump, and/or effluent valve based on temperature and pressure sensor data, the control system is able to set the preferred conditions for particulate heterodiamond and homodiamond unit cell formation. Precise amounts of homogeneous reactant solution can be delivered or dispensed to the spray nozzle by the use of well-calibrated metering pumps.

Effluent ports are generally attached to the input port of a GC-MS, which often has its own controllable pump system. The GC-MS spectrometer can monitor effluent either continually or periodically and provide effluent content data to the system controller. Process control may be based upon compositional data, physical parameter data, relative positional data, morphological data of the particulate diamond mass, etc. Mass spectrometer software is available both commercially and as open source programs that can be easily used in combination with the control system of the present invention.

The control system software for the present invention not only maintains preferred reaction conditions but also controls the proper sequence of events. For example, the switchable high-energy discharge apparatus can be actuated on and off depending on the effluent data provided by the mass spectrometer. The control system software can be written in a variety of programming languages, but it is particularly useful to use languages that provide bit-level addressing and manipulation, such as C or C++, because these allow for easy interfacing with input and output ports (e.g., reading from or writing to ND and D/A converters directly, respectively). Otherwise, interface routines can be coded in assembly language and control processing can be done in a higher level language. Alternatively, instrument control software development systems are available commercially (e.g., LabVIEW or LabWindows/CVI from National Instruments) that can be adapted to implement the control system software for the present invention.

Figure 7:
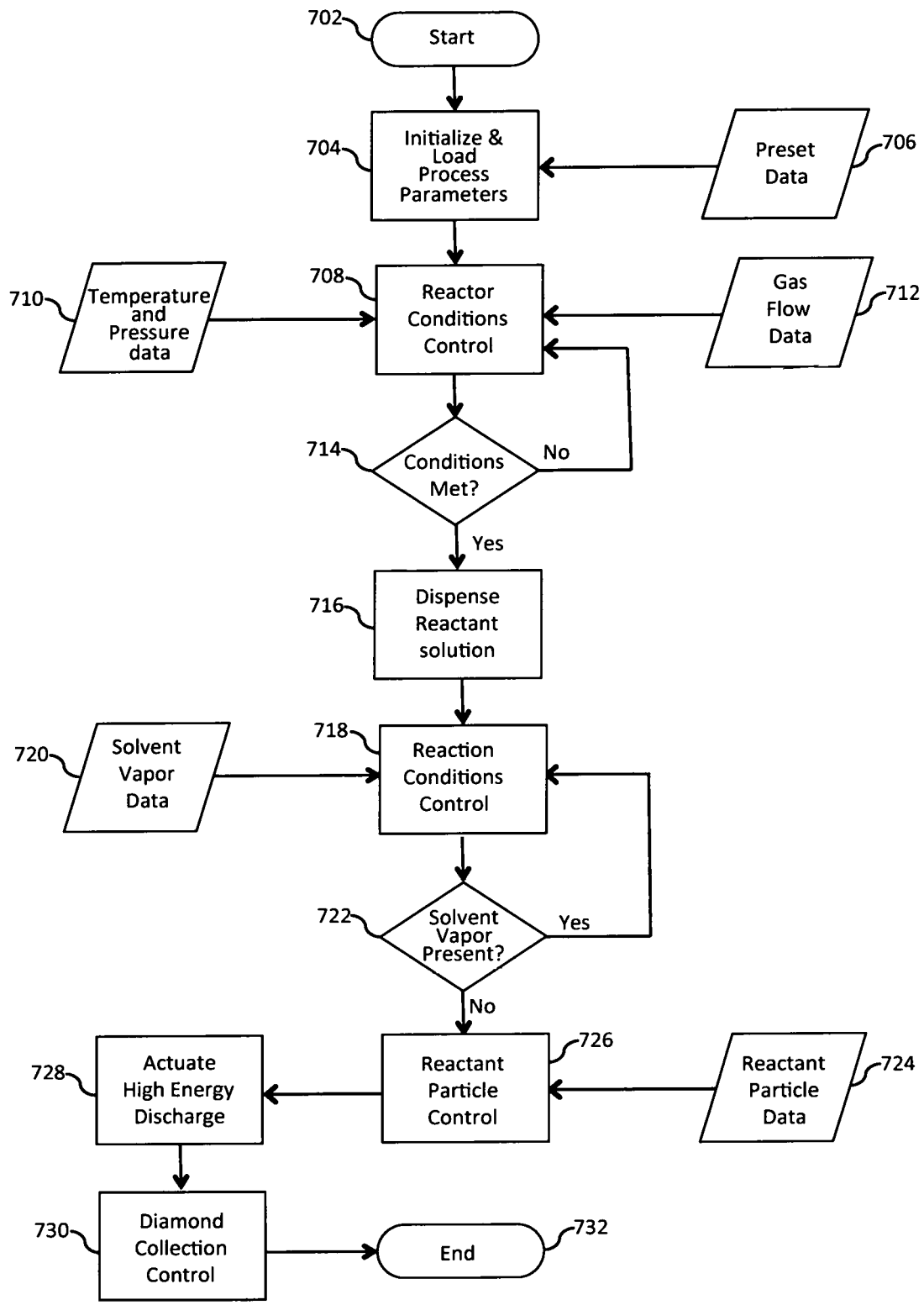
FIG. 7 illustrates a flow diagram for controlling the particulate diamond forming and processing apparatus.

FIG. 7 illustrates a flow diagram for controlling the particulate diamond forming and processing apparatuses of the present invention. A brief, general description follows. To begin the process of producing particulate diamond, the control system is initialized and process parameters, such as temperature, pressure, and gas flow data, are loaded. Then, if suitable reaction conditions are met, a reactant solution is dispensed. If suitable reaction conditions have not yet been established, the control system will make any required parameter adjustments. Next, the control system determines whether any solvent vapor is remaining prior to initiating the combinatorial synthesis reaction with actuation of a high energy discharge. If any solvent vapor is remaining, the control system will ensure that this remaining solvent vapor is removed prior to actuation of the high energy discharge. Then, upon actuation of the high energy discharge, diamond collection is effectuated under the auspices of the control system.

A detailed description of FIG. 7 is now provided. The process begins at start 702. For a particular process cycle, preset data 706 define the necessary reactor control parameters to produce particulate diamond with desired characteristics. These are typically stored in digital recording media known in the art and may be selected by an operator through a keyboard, GUI, or other digital input device. Preset data 706 are provided to the initialize and load process parameters block 704, which is the program element that receives data into the control program for the production of diamond particles with a particular, pre-selected set of characteristics (e.g., size, purity, composition, etc). Process parameters are provided to reactor conditions control block 708, and the control program functions to set temperature, pressure and carrier gas flow to the necessary values of the process parameters. Typically, the reactor conditions control block 708 includes a delay that allows for optimum reactor to achieve the optimum conditions for producing the desired particular diamond product. Temperature and pressure data 710 and carrier gas flow data 712 are provided to reactor conditions control 708 from temperature, pressure, and flow sensors in the reactor. Reactor conditions control 708 develops error signals between the desired preset parameters and the sensor data. These error signals are provided to reactor actuators (e.g., valves, regulators, temperature controller, etc.) to drive the internal reactor environment to the desired preset parameter values. If the conditions met comparator 714 determines that the desired reactor conditions are not met, then this information is provided to reactor conditions control 708 and a delay is set to allow the system more time to attain desired preset values. When the conditions met comparator 714 determines that the desired preset values have been met, then the dispense reactant solution step 716 enables the actuation of the reactant solution dispenser (e.g., spray nozzle, pipette, etc.) and droplets of the reactant solution are formed in the reactor. Solvent evaporates and solvent vapor data 720 is provided to the reaction conditions control 718. Solvent vapor present comparator 722 determines the presence of solvent vapor in the reactor carrier gas. If solvent vapor is present then reaction conditions control 718 institutes are delay to allow for additional solvent vapor egress. When solvent vapor present comparator 722 determines sufficient solvent vapor has left the system (i.e., it is completely gone or at an acceptably low level), the control program proceeds to the next step, which is reactant particle control 726. Reactant particle control 726 receives data relating to the chemical and physical state of the homogeneous solid reactant mixture from reactant particle data 724. These data can be provided by optical sensors that measure optical parameters such as light scattering, infrared and/or transmission spectra, etc. When the desired density and/or concentration of the reactant particles is met, reactant particle control 726 enables the actuation of the high energy discharge 728 at least once to form diamond particles with preset characteristics. The diamond is collected according to diamond collection control 730 and this concludes a single cycle of the particulate diamond production process at end 732.

It is also emphasized that there is considerable flexibility permitted in the placement of reactor or apparatus components other than as shown in the figures for this specification. For example, the reservoir of the reactant solution may be remote from the reactor. That is, the reservoir of the reactant solution need not be contained in the reactor, Further, if the membrane has low susceptance, the microwave source, for example, may be located outside of the reaction chamber.

The present invention as specified herein and as shown in the figures, can be used in variety of commercially valuable applications. The apparatuses can be adapted for onsite or field deposition of diamond particles onto substrates or work pieces such as cutting, abrading, or boring tool surfaces. For example, a portable apparatus is contemplated for oil field use where spent drill bits are remediated onsite and recoated with diamond particles. As another example, machine tools can be recoated on the shop floor.

The present invention can also be used for stationary, large scale manufacturing in a factory environment. For example, the apparatus can be used to coat saw blades, razor blades, cutlery, drill and router bits, scalpels, and the like, as well as cooking equipment. The need for high purity nano-diamond particles in the pharmaceutical and cosmetics industries, as well as quantum computing devices, etc., can be met by the present invention.

What is claimed is:

1. A solid state combinatorial synthesis of particulate diamond, comprising steps of:
    a) forming a reactant solution having a source of reactant atoms, a tetrahedranoidal compound reactant dihydrobenzvalene, and a solvent;
    b) forming liquid droplets of the reactant solution, and dispersing the liquid droplets thereof upon a substrate;
    c) evaporating the solvent from the liquid droplets of the solution on the substrate to form particles containing a homogeneous solid mixture of the reactants on the substrate; and
    d) exposing the particles of the homogeneous solid mixture to a high energy discharge thereby forming diamond particles upon said substrate.

2. The solid state combinatorial synthesis of claim 1, wherein the source of the reactant atoms is a carbon source.

3. The solid state combinatorial synthesis of claim 1, wherein the source of the reactant atoms is a heteroatom source.

4. The solid state combinatorial synthesis of claim 3, wherein the heteroatom source is a nitrogen source.

5. The solid state combinatorial synthesis of claim 1, wherein the formed diamond particles are non-adherent to another material.

6. The solid state combinatorial syntheses of claim 1, wherein the diamond particles are formed on the substrate and attached thereto.

7. The solid state combinatorial synthesis of claim 1, wherein the diamond particles are formed on the substrate and are removable therefrom.

8. The solid state combinatorial synthesis of claim 2, wherein the carbon source is cubane.

9. The solid state combinatorial synthesis of claim 4, wherein the nitrogen source is hydrazine.

10. The solid state combinatorial synthesis of claim 1, wherein said liquid droplets of the solution of step b) are formed by passing the solution of step a) through a controllable dispenser.

11. The solid state combinatorial synthesis of claim 10, wherein the controllable dispenser is an ultrasonic atomizing nozzle.

12. The solid state combinatorial synthesis of claim 10, wherein the controllable dispenser is a multiple horn atomizer with high frequency capability.

13. The solid state combinatorial synthesis of claim 10, wherein the controllable dispenser is a pipette.

14. The solid state combinatorial synthesis of claim 1, wherein the formed solution of step a) has a concentration of reactants determined by a desired particle size.

15. The solid state combinatorial synthesis of claim 1, wherein the liquid droplets formed of solution a) in step b) have a droplet size determined by a desired particle size of diamond to be produced.

16. The solid state combinatorial synthesis of claim 1, which further comprises controlling reaction parameters with a system controller, wherein a sensor and actuator suite communicates bidirectionally with the system controller through sensor and actuator bus, main system bus and system controller bus.

17. The solid state combinatorial synthesis of claim 1, which further comprises a step e) of real-time monitoring of the forming diamond particles by optical sensing.

18. The solid state combinatorial synthesis of claim 17, wherein said optical sensing measures a change in at least one of light dispersion, index of refraction, reflection or diffraction in the forming diamond particles.

19. The solid state combinatorial synthesis of claim 1, wherein similar polarities between the droplet solvent and the substrate favor formation of planar diamond and opposing polarities between the droplet solvent and the substrate favor formation of spherical diamond particles.

* * * * *